US012761991B2

(12) United States Patent
Chang et al.

(10) Patent No.: US 12,761,991 B2
(45) Date of Patent: Oct. 13, 2026

(54) PERFORMING API SERVICES USING ZONE-BASED TOPICS WITHIN A PUB/SUB MESSAGING INFRASTRUCTURE

(71) Applicant: INTERNATIONAL BUSINESS MACHINES CORPORATION, Armonk, NY (US)

(72) Inventors: Rong Nickle Chang, Pleasantville, NY (US); Kumar Bhaskaran, Englewood Cliffs, NY (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 18/068,738

(22) Filed: Dec. 20, 2022

(65) Prior Publication Data

US 2024/0202053 A1 Jun. 20, 2024

(51) Int. Cl.

*G06F 3/00* (2006.01)
*G06F 9/54* (2006.01)
*H04L 41/50* (2022.01)

(52) U.S. Cl.

CPC .......... *G06F 9/547* (2013.01); *H04L 41/5058* (2013.01)

(58) Field of Classification Search

CPC ........................................................ G06F 9/54
See application file for complete search history.

(56) References Cited

U.S. PATENT DOCUMENTS 8,549,471 B2 10/2013 Jung
8,793,359 B1 * 7/2014 Fiebig ................. G06F 11/3003 719/313
8,904,486 B2 12/2014 Bhaskaran
9,438,625 B1 * 9/2016 Yang .................. H04L 63/1441
9,998,550 B2 6/2018 Chang
10,528,627 B1 * 1/2020 Dunsmore .............. H04L 43/10
10,884,825 B2 1/2021 Hao
(Continued)

FOREIGN PATENT DOCUMENTS

CN 103618790 A 3/2014
CN 109842654 A 6/2019

OTHER PUBLICATIONS

Thomas Hunter II, Consumer-Centric API Design, (Year: 2014).*
(Continued)

*Primary Examiner* — Lechi Truong
(74) *Attorney, Agent, or Firm* — CHIP LAW GROUP

(57) ABSTRACT

A method, computer program product, and computer system for performing an Application Programming Interface (API) service using zone-based topics within a publish/subscribe (pub/sub) messaging infrastructure. An API service request sent by a client entity is received and specifies an API service to be fulfilled. A selection of an API service endpoint configured to execute the API service is received. Messages are posted to respective pub/sub zone-based topics, resulting in selection of workers subscribed to the respective zone-based topics. Each zone-based topic includes tasks to be performed in a specified one or more zones. For each zone-based topic, the tasks of the zone-based topic are implemented by executing the worker selected for the zone-based topic. The tasks of the zone-based topics include invoking the API service endpoint for the requested API service and making a fulfillment result of the API service available to the client entity.

17 Claims, 19 Drawing Sheets

(56) References Cited

U.S. PATENT DOCUMENTS

| | | | | |
|---|---|---|---|---|
| 11,250,075 | B1 * | 2/2022 | Al Majid | G06F 16/951 |
| 2002/0154755 | A1 | 10/2002 | Gourraud | |
| 2005/0080640 | A1 | 4/2005 | Bhaskaran | |
| 2008/0183485 | A1 * | 7/2008 | Drabble | H04W 4/021 705/1.1 |
| 2008/0183530 | A1 | 7/2008 | Bagchi | |
| 2009/0158238 | A1 | 6/2009 | Jung et al. | |
| 2012/0136883 | A1 * | 5/2012 | Kwabi | G06Q 30/08 707/E17.014 |
| 2014/0278814 | A1 * | 9/2014 | Stallman | G06Q 10/0637 705/7.36 |
| 2015/0161649 | A1 * | 6/2015 | Eggleston | G06F 16/9535 705/14.66 |
| 2017/0244783 | A1 * | 8/2017 | Maresca | H04L 67/104 |
| 2018/0075476 | A1 * | 3/2018 | Asaftei | G06Q 30/0244 |
| 2018/0357564 | A1 * | 12/2018 | Braghin | G06N 5/04 |
| 2019/0340041 | A1 * | 11/2019 | Banisadr | H04L 67/55 |
| 2019/0384617 | A1 * | 12/2019 | Jain | G06F 9/547 |
| 2021/0067550 | A1 * | 3/2021 | Paine | H04L 63/1491 |
| 2021/0073654 | A1 * | 3/2021 | Ameri | G06F 16/9536 |
| 2021/0133734 | A1 * | 5/2021 | Jensen | G06F 9/466 |
| 2021/0304024 | A1 * | 9/2021 | Baughman | H04L 67/535 |
| 2022/0353109 | A1 * | 11/2022 | Elliott | H04L 67/01 |
| 2023/0409535 | A1 * | 12/2023 | Kashi Visvanathan | H04L 9/14 |

OTHER PUBLICATIONS

Shweta Khare, Scalable Edge Computing for Low Latency Data Dissemination in Topic-based Publish/Subscribe. (Year: 2018).*

Wikipedia, Representational state transfer, Retrieved from Internet on Sep. 28, 2022: https://en.wikipedia.org/wiki/Representational_state_transfer, 6 pages.

Telecom API Market Research 2022—Growth, Trends, Outlook and Future Scope Analysis 2030, Published: Dec. 6, 2022, Retrieved from Internet on Dec. 18, 2022: https://www.marketwatch.com/press-release/telecom-api-market-research-2022-growth-trends-outlook-and-future-scope-analysis-2030-2022-12-06?tesla=y, 7 pages.

* cited by examiner

PERFORMING API SERVICES USING ZONE-BASED TOPICS WITHIN A PUB/SUB MESSAGING INFRASTRUCTURE

BACKGROUND

The present invention relates in general to performing Application Programming Interface (API) services, and in particular to performing API services using zone-based topics within a publish/subscribe (pub/sub) messaging infrastructure.

In a networked computing environment with many interconnected servers on the Internet and in intranets, there are many API service endpoints that the servers use to provide respective computing capabilities of the servers. From the viewpoint of an API service client entity, the many API service endpoints are heterogeneous in terms of endpoint invocation properties, endpoint invocation models (e.g., synchronous vs asynchronous), endpoint operation type (e.g., create, read, update, and delete), endpoint operation specification (including operation arguments, input data format, and output data format), endpoint invocation authentication credentials (e.g., API key, API key secret, temporal API invocation token, etc.). Two different API service endpoints may provide a same capability with two different sets of endpoint invocation properties. A client entity must accommodate the heterogeneities if the client entity needs to acquire computing capabilities from the servers, subject to constraints, requirements, and regulations; e.g., network firewall rules, enterprise security and privacy requirements, and data regulations such as General Data Protection Regulation (GDPR). However, a client entity is unable to adequately invoke the API service endpoints for the client's effective and efficient usage. Accordingly, there is a need to mediate performance of an API service whose implementation requires one or more API service endpoints to be flexibly deployed.

In the field of performing API services in the presence of API service endpoint heterogeneity, a mediator is often implemented as a gateway, a server, or a client library package composed of a set of endpoint adaption modules in terms of the API service endpoints needed by the target client entities. Credential sharing, single sign-on, or third-party based authentication is used to accommodate endpoint invocation heterogeneity.

For example, US-20020154755-A1, titled "Communication method and system including internal and external application-programming interfaces", recites: "The applications access a physical gateway using an external-service application-programming interface. The physical gateway communicates with the network via an internal-service application programming interface. Internal-service applications resident on the physical gateway utilize internal-service application-programming interfaces to communicate with network entities of the network."

As another example, US-20090158238-A1, titled "Method and apparatus for providing API service and making API mash-up, and computer readable recording medium thereof", recites: "A mash-up service is a technology producing a new API by putting two or more APIs together in a web." and teaches "a method of providing an application program interface (API) service, the method including: generating meta-data for executing an API; generating resource data for generating a mash-up of the API; generating description data corresponding to the API, the meta-data, and the resource data; and generating an API package comprising the API, the meta-data, the resource data, and the description data"

There is no known method for use cases in which the mediator cannot invoke the target API service endpoints directly due to constraints, requirements, and/or regulations. For example, a server may run inside a secure intranet subnet with customer-provided data while the target client entities must acquire the server's analytics capability through the public Internet. In this use case, the mediator cannot run on the Internet (since the mediator cannot reach the server due to enterprise firewall rules), on the intranet outside the secure subnet (since the mediator cannot be reached by the target client entities and may not be allowed to reach the server per enterprise security requirements), nor inside the secure intranet subnet (since the mediator cannot be reached by the target client entities due to enterprise firewall rules).

Thus, there is a need to mediate the performance of an API service in a manner that enables the mediator to invoke the target API service endpoints directly while satisfying constraints, requirements, and/or regulations.

SUMMARY

Embodiments of the present invention provide a method, a computer program product and a computer system for performing Application Programming Interface (API) services using zone-based topics within a publish/subscribe (pub/sub) messaging infrastructure.

In a first embodiment, one or more processors receive an API service request sent by a client entity. The API service request specifies an API service to be fulfilled. The one or more processors receive a selection of an API service endpoint configured to execute the requested API service. The one or more processors post messages to respective pub/sub zone-based topics of a sequence of zone-based topics, resulting in selection, by the one or more processors, of workers who are subscribed to the respective zone-based topics. Each zone-based topic defines one or more tasks to be performed in a specified one or more zones. For each zone-based topic, the one or more processors implement the one or more tasks of the zone-based topic. Implementing the one or more tasks is performed by executing the worker selected for the zone-based topic. The tasks of the zone-based topics include invoking the selected API service endpoint for the API service and making a fulfillment result of the API service available to the client entity.

The first embodiment provides a technical feature of performing an API service in the presence of API service endpoint heterogeneity, where performing the API service can be done by a collection of networked API service mediation programs in execution (or microservices). As a technical feature, the client entity requests, e.g., based upon an API service catalog, the distributed mediator system to perform the API service and, advantageously, does not need to know the invocation specifics for any of the qualified API service endpoint candidates. As a technical feature, specification of the requested API service, together with the metadata that a distributed mediator maintains for the registered API service endpoints stored in the API service catalog, enables the distributed mediator to determine the fulfillment model for the request (i.e., synchronous vs. asynchronous) and to identify a set of qualified API service endpoints in terms of the properties of the request; e.g., the network firewall zone which the requesting client entity is in, applicable enterprise security and privacy requirements, and input and output data handling constraints per applicable data regulations. The distributed mediator encompasses a set of workers and each worker is program code of a microservice in execution.

As a technical feature, the workers of the distributed mediator may not invoke each other's API interfaces directly due to various constraints, so that a cross-network messaging infrastructure is needed. Advantageously, to assure availability, scalability, serviceability, resilience, and reliability of the distributed mediator, each type of worker may have multiple replicas, and the number of instances of a specific worker type may be added or removed on demand per the operating conditions of the distributed mediator. Worker instances of the same type may be advantageously grouped and deployed per the requirements for the API service requests; e.g., network firewall rules, enterprise security and privacy requirements, and data regulations.

Thus, the first embodiment advantageously provides a technical feature of reciting how to implement the distributed mediator using a cross-network pub/sub messaging infrastructure (which can be implemented, e.g., via the Kafka open-source software).

Advantageously, the first embodiment provides a technical feature of microservice zones which are identified and used in terms of deployment and service requirements for the needed workers of the distributed mediator, and pub/sub topics are advantageously defined in terms of the worker grouping needs and the needed microservice zones.

In a second embodiment which is optional, for each zone-based topic, the one or more tasks of the zone-based topic include a task to update a fulfillment status indicator denoting an extent to which the API service request has been fulfilled.

A technical feature facilitating the advantage of enabling the client entity to track the progress of an asynchronously fulfilled request and to assure eventual successful/failed completion of every asynchronously fulfilled request despite unexpected failure or partial failure of the distributed mediator system, is implemented by having each topic worker update a fulfillment status indicator after each topic worker completes the tasks for a topic message that each topic worker receives. The updates also advantageously enable recovery from temporal failures and successful completion of the remaining fulfillment tasks.

In a third embodiment which is optional, the one or more processors receive a selection of an API service invocation model supported by the selected API service endpoint. The implementing of the one or more tasks of the zone-based topic is in accordance with the selected API service invocation model, and the invoking of the API service endpoint is in accordance with the selected API service invocation model. The API service invocation model is either a synchronous invocation model or an asynchronous invocation model, with respect to interactions between the API service endpoint and the workers.

The technical feature of enabling the API service invocation model to be either a synchronous invocation model or an asynchronous invocation model advantageously permits use of an API service invocation model that is supported by the selected API service endpoint.

In a fourth embodiment which is optional, the sequence of zone-based topics is denoted as $T_1, T_2, \ldots, T_M$, wherein M is at least 3, wherein the posting of the message to the zone-based topic $T_m$ is performed by executing the worker selected for the zone-based topic $T_{m-1}$ (m=2, . . . , and M).

The fourth embodiment provides a technical feature of having each worker of a currently processed pub/sub zone-based topic post a message to a next zone-based topic, which is advantageously an efficient way of launching the next zone-based topic with minimal processing logic in transitioning from the currently processed pub/sub zone-based topic to the next zone-based topic.

In a fifth embodiment which is optional, each topic is zone-based with respect to N zones, wherein N is at least 2.

The technical feature of having multiple microservice zones per pub/sub topic advantageously mitigates and resolves the current disadvantage of the mediator being unable invoke the target API service endpoints directly due to constraints, requirements, and/or regulations as explained supra in the BACKGROUND section.

Advantageously, the multiple microservice zones are identified and used in terms of deployment and service requirements for the needed workers of the distributed mediator, and pub/sub topics are advantageously defined in terms of the worker grouping needs and the needed microservice zones.

In a sixth embodiment which is optional, in response to a zone related problem pertaining to executing one worker selected for one zone-based topic wherein the one worker is executed in one zone of the N zones, the one or more processors replace the one worker by another worker subscribed to the one zone-based topic and executed in another zone of the N zones.

The technical feature of using the multiple zones to replace the one worker with another worker which is executed in another zone advantageously resolves a zone related problem pertaining to executing the one worker.

DETAILED DESCRIPTION

Figure 1:
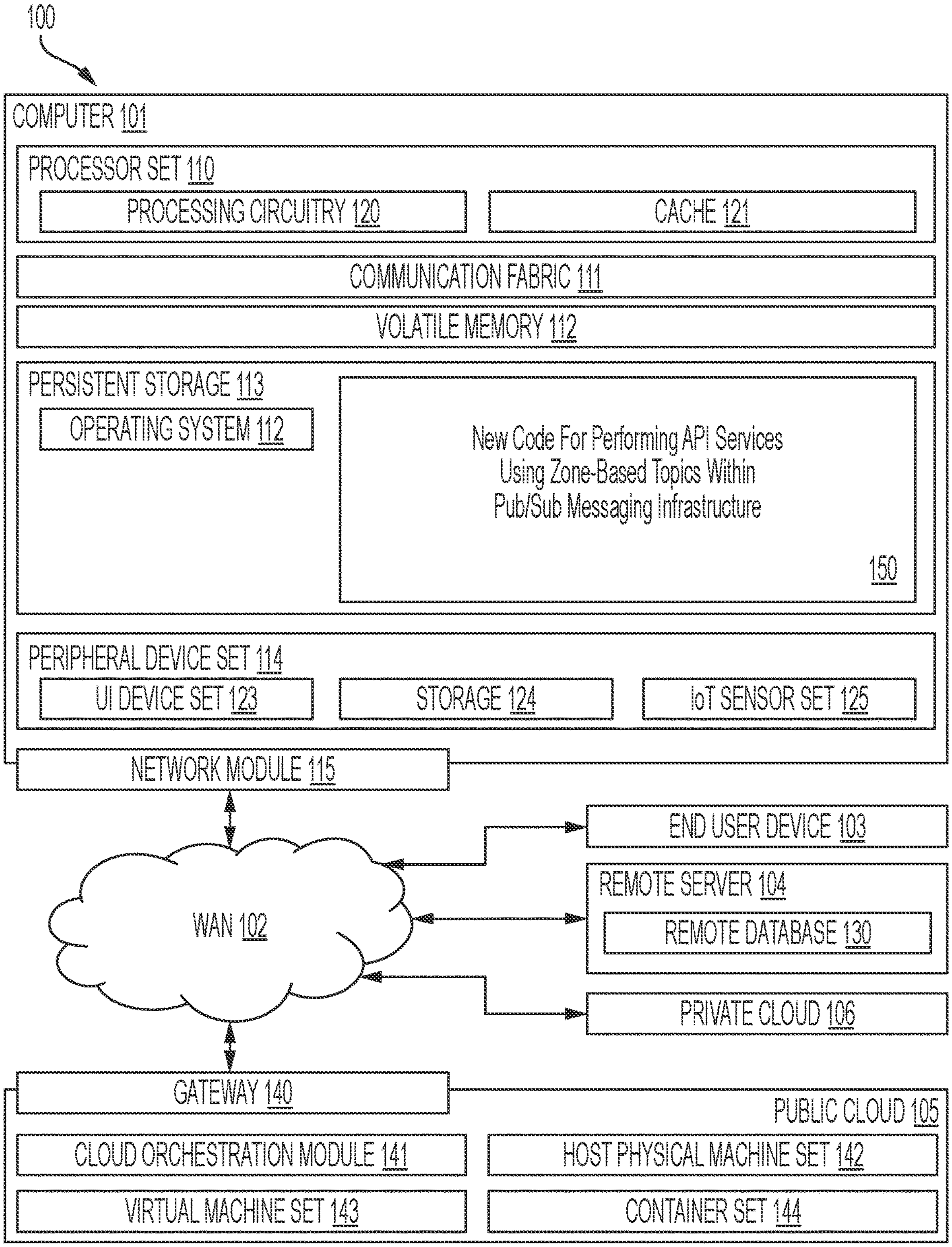
FIG. 1 depicts a computing environment containing an example of an environment for the execution of at least some of the computer code involved in performing the inventive methods, such as new code for performing Application Programming Interface (API) services using zone-based topics within a publish/subscribe (pub/sub) messaging infrastructure.

FIG. 1 depicts a computing environment 100 containing an example of an environment for the execution of at least some of the computer code involved in performing the inventive methods, such as new code 150 for performing Application Programming Interface (API) services using zone-based topics within a publish/subscribe (pub/sub) messaging infrastructure. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments of the present invention relate generally to data-aware self-managed fulfillment of enterprise Application Programming Interface (API) service requests via other individually administered API services, which can be deployed inside and outside of an enterprise with respective synchronous/asynchronous request-response models, computing environments, and data access constraints.

Use cases pertaining to embodiments of the present invention deliver Representational State Transfer (REST) API services through the Internet and intranet via individually administered IT-level API service endpoints deployed on Cloud and/or intranet with automated input/output data transfer for frontend API client applications and backend API service endpoints.

In an environment with many cataloged enterprise Application Programming Interface (API) services that are implemented via many individually administered Internet/intranet API service endpoints (implemented via servers and/or server clusters under a synchronous and/or asynchronous request fulfillment model), embodiments of the present invention describe how to self-manage lifecycle of all qualified enterprise API service requests in a unified, data-aware, and resilient manner.

The present invention provides a fulfillment-state transition model for monitoring a fulfillment status of every incomplete service API request, via a fulfillment status indicator, considering: (a) target backend API services can be invoked synchronously or asynchronously; and (b) backend API service processing results may need to be post processed with respect to data movement and transformation as part of the request fulfillment tasks (see FIG. 2).

Figure 3:
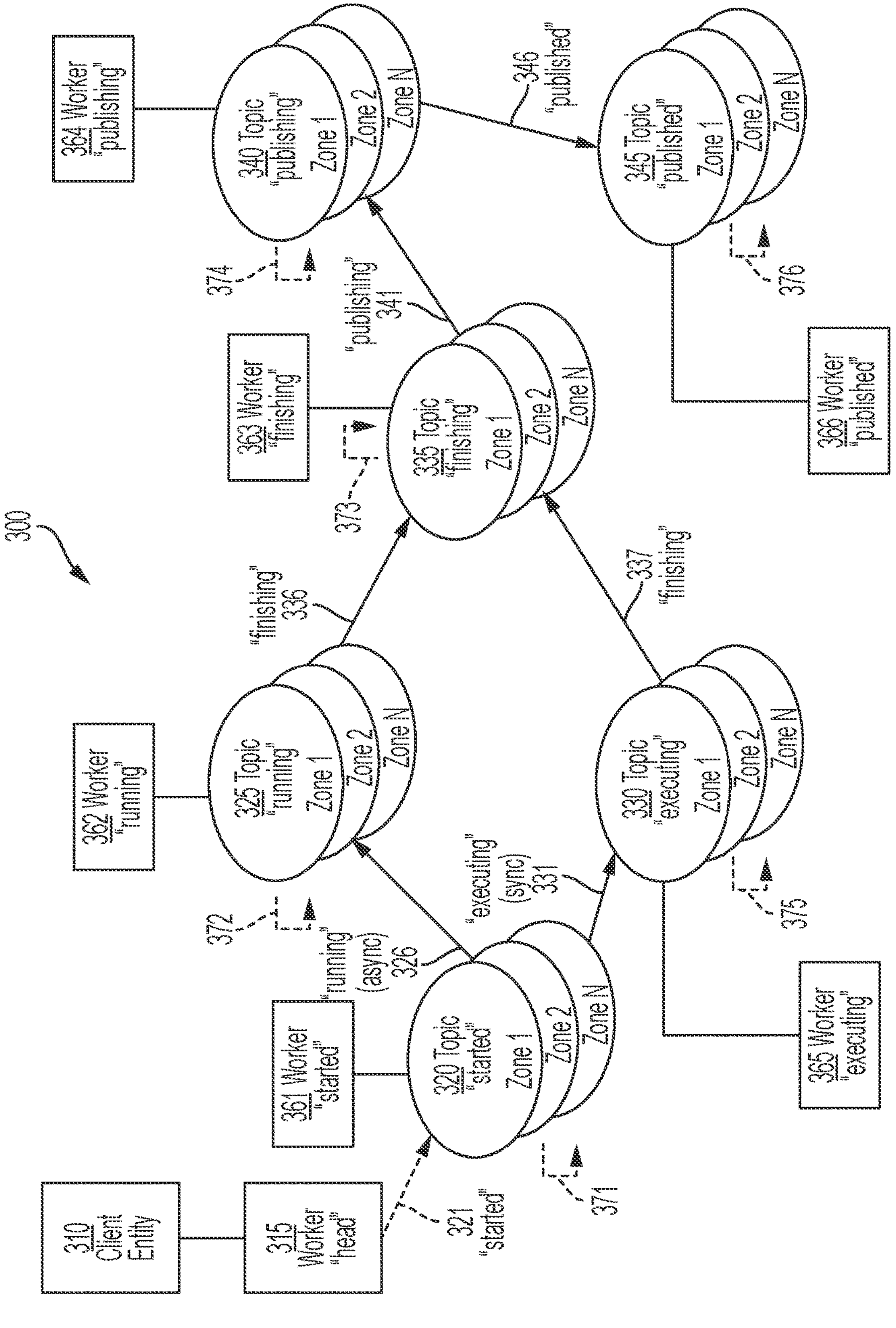
FIG. 3 is a system for performing an Application Programming Interface (API) service via performance of tasks required by zone-based topics within a publish/subscribe (pub/sub) messaging infrastructure, in accordance with embodiments of the present invention.

The present invention provides a zone-based flow of "pub/sub" messaging topics (a.k.a., "topic flow") in terms of security/compliance requirements, by which every fulfillment state change results in posting a "pub" message to the target zone-based pub/sub topic, which, in turn, results in executing a qualified topic subscriber to complete the assigned service-dependent fulfillment task (see FIG. 3).

The present invention provides topic-based distributed algorithms that run in various fulfillment-task execution zones and collectively perform backend API service endpoint selection and necessary data preparation/transformation/publishing tasks with support for API invocation retry policy.

Figure 12:
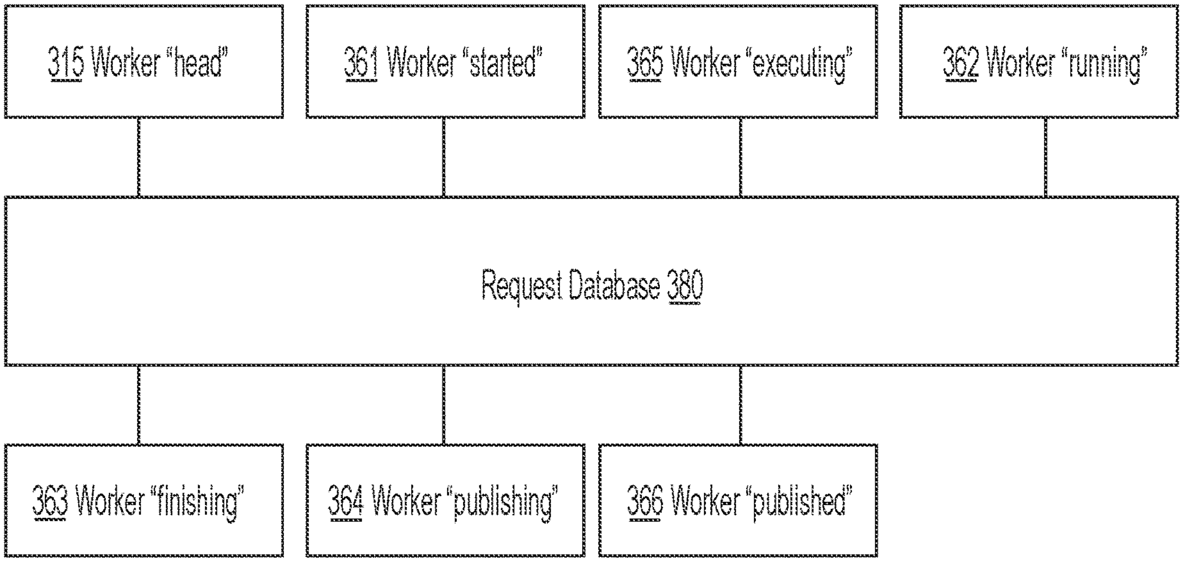
FIG. 12 depicts a request database and workers connected to the request database, in accordance with embodiments of the present invention.

The present invention provides a request database that enables proactive checking for the request fulfillment status for all cataloged REST APIs (see FIG. 12).

System of Topics

Figure 2:
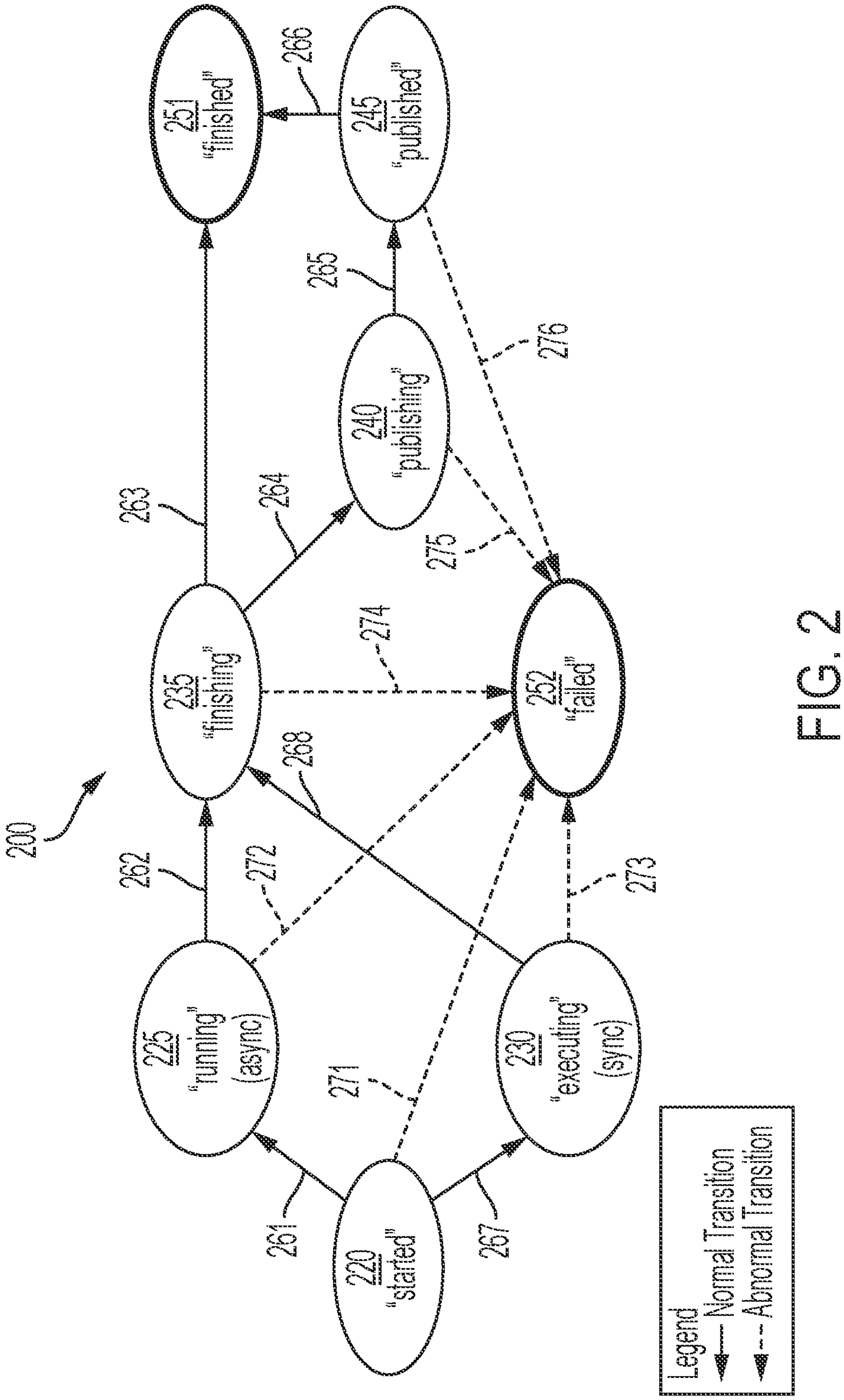
FIG. 2 is a system depicting topics to which respective messages have been posted using a pub/sub messaging infrastructure, in accordance with embodiments of the present invention.

FIG. 2 is a system 200 depicting topics 220, 225, 230, 235, 240, and 245 to which respective messages have been posted using a pub/sub messaging infrastructure, in accordance with embodiments of the present invention.

The topics 220, 225, 230, 235, 240, and 245 are respectively named as topic "started" 220, topic "running" 225, topic "executing" 230, topic "finishing" 235, topic "publishing" 240, and topic "published" 245.

Each topic has associated program code of a microservice, denoted as a "worker", and specified tasks to be performed by the worker by executing the program code of the worker.

The topics and associated workers are:

(topic "started" 220: worker "started"),
(topic "running" 225: worker "running"),
(topic "executing" 230: worker "executing"),
(topic "finishing" 235: worker "finishing"),
(topic "publishing" 240: worker "publishing"), and
(topic "published" 245: worker "published").

The naming of topics and associated workers is via use of quoted lower-case words (e.g., topic "started" 220 and worker "started"). An equivalent alternative naming of topics and associated workers is via use of unquoted upper-case words (e.g., topic STARTED 220 and worker STARTED, and similarly for "running"/Running, "executing"/EXECUTING, "finishing"/FINISHING, "publishing"/PUBLISHING, and "published"/PUBLISHED)

The topics and associated tasks and workers in FIG. 2 are some of the elements of a system for performing an Application Programming Interface (API) service that is described in FIG. 3. Other elements of the method of FIG. 3 (e.g., workers) do not appear explicitly in FIG. 2.

Topics may be processed sequentially, which means that after successful completion of performance of tasks by the worker of one topic, the tasks of a next topic are performed by the worker of the next topic. For example, topics 220, 225, and 235 may be processed sequentially.

A successful performance of the tasks of a topic is characterized by a normal transition to a next topic or to a "finished" state 251. FIG. 2 depicts normal transitions 261-268.

If performance of any task for each topic by the associated worker fails, then the topic is said to have an abnormal transition to a failed state 252. In FIG. 2, topics 220, 225, 230, 235, 240, and 245 may have abnormal transitions 271, 272, 273, 274, 275, and 276, respectively.

Failure of performance of a task during execution of a worker may be due to, inter alia: a "bug" in the program code of the worker, a software error originating outside the worker in a manner that affects execution of the worker, a hardware failure, etc.

Thus, a sequential processing of topics either is normal and ends in a "finished" state 251 or is abnormal and ends in a "failed" state 252.

The system 200 can be used to invoke an API service endpoint to execute a requested service. The API service endpoint can be invoked asynchronously or synchronously.

If it is determined that the API service endpoint is to be invoked asynchronously, then the transition 261 from topic "started" to topic "running" 225 occurs, as denoted by "(async)" in topic "running" 225.

If it is determined that the API service endpoint is to be invoked synchronously, then the transition 267 from topic "started" to topic "executing" 230 occurs, as denoted by "(sync)" in topic "executing" 230.

System for Performing API Service

FIG. 3 is a system 300 for performing an Application Programming Interface (API) service via performance of tasks required by zone-based topics within a publish/subscribe (pub/sub) messaging infrastructure, in accordance with embodiments of the present invention.

The abnormal transitions shown in FIG. 2 do not appear in FIG. 3, because the method of FIG. 3 uses error correction mechanisms 371-376 to reverse or mitigate any failures in execution of workers that may occur.

A "zone" is a space in which software code is executed or data is stored. A zone may be the Internet, a network domain characterized by a domain name, an Internet Protocol (IP) resource characterized by a domain name (e.g., a personal computer used to access the Internet, or a server computer), an intranet, a subnet of an intranet or network, a geographical location such as a country whose regulations or laws place constraints on software execution, data storage, etc.

In a pub/sub messaging infrastructure, a message may be posted to a topic. A topic of the present invention encompasses one or more tasks to be performed by a worker who subscribes to the topic. A worker is program code of a microservice in execution.

Performance of a task may be subject to at least one zone constraint. For example, data stored in an intranet zone cannot be accessed by software being executed in the Internet zone. As another example, data stored in a Europe zone may not be accessed by a worker in a United States zone because of existing regulations in the European zone imposed on software executed from a zone located outside the Europe zone. As another example, a worker running in an intranet zone may not be permitted to run in a specified intranet zone whose usage is open to only specific workers or specific types of workers.

A zone-based topic is defined as a topic having a set of tasks to be performed by execution of a worker associated with the zone, subject to the set of tasks comprising one or more zone-limited tasks. A set of tasks is defined as a set of one or more tasks. A zone-limited task is defined as a task whose performance by execution of a worker is subject to at least one zone constraint A zone constraint is either an execution zone constraint or a data zone constraint. An execution zone constraint is defined as a constraint that limits execution of a task to one or more specific zones. A data zone constraint is defined as a constraint that limits storage of data used in executing a task to one or more specific zones. The scope of "data" with respect to a data zone constraint encompasses input data for executing the task, data generated from executing the task, a subprogram or software module used in executing the task, etc.

Establishment of a topic in a pub/sub system may include metadata for the topic, wherein the metadata identifies one or more zones required to perform the tasks associated with the topic.

The process of a worker subscribing to a topic requires the worker to be able to perform the one or more zone-limited tasks required to be performed for the topic. Thus, the worker must be able to satisfy the at least one zone constraint pertaining to the zone-limited tasks. A worker who is able to perform the one or more zone-limiting tasks is said to be qualified for performing the one or more zone-limiting tasks pertaining to the topic.

In one embodiment, a System Administrator will register a worker for a topic only if the worker is qualified for performing the one or more zone-limiting tasks pertaining to the topic. Thus in this embodiment, the only subscribers to the topic are those workers who are qualified for performing the one or more zone-limiting tasks.

In response to a message being posted a topic, the pub/sub messaging infrastructure will publish the message to one or more workers who have subscribed to the topic, after which the one or more workers to which the message has been published begin performing the tasks of the topic.

In a first embodiment, the pub/sub messaging infrastructure is instructed to publish the message to only one worker who is a subscriber to the topic, regardless of how many workers have subscribed to the topic, after which the only one worker begins performing the tasks of the topic.

In a second embodiment, the pub/sub messaging infrastructure will publish the message to all workers who have subscribed to the topic, after which all of such workers begin performing the tasks of the topic. As soon as one of the workers completes performance of all of the tasks of the topic, the topic database is updated to indicate completion of the tasks of the topic. This updating prevents any other worker from overriding the already completed tasks by one of the workers.

With either the preceding first embodiment or second embodiment, a failure to complete all of the tasks of the topic within a specified threshold period of time triggers a re-posting of the message to the topic to obtain another worker (subscriber) to perform the tasks of the topic.

Failure to complete all of the tasks of the topic within the specified threshold period of time may be caused, inter alia, by: (i) no worker has responded to the posting of the message to the topic; (ii) a worker performing the tasks of the topic fails to complete such performance within the threshold period of time due to a coding bug encountered in performing the tasks, (iii) a system abort or failure, etc.

The system 300 in FIG. 3 depicts client entity 310, worker "head" 315, pub/sub topics (320, 325, 330, 335, 340, 345), workers (361-366) selected to perform tasks required by respective topics. FIG. 3 additionally includes worker "head" 315.

The pub/sub topics in FIG. 3 include: topic "started" 320, topic "running" 325, topic "executing" 330, topic "finishing" 335, topic "publishing" 340, and topic "published" 345.

Each topic has a topic name. For example, topic "started" 320 has the topic name of "started" or STARTED.

Each topic is zone-based with respect to the N zones shown, where N is at least 2, wherein N is topic dependent and thus can have a different value for different topics. In one embodiment, N has a same value for each of the zone-based topics in FIG. 3. In one embodiment, N does not have the same value for each of the topics in FIG. 3 and differs for at least two of the zone-based topics.

The workers in FIG. 3 include: worker "head" 315, worker "started" 361 for topic "started" 320, worker "running" 362 for topic "running" 325, worker "executing" 365 for topic "executing" 330, worker "finishing" 363 for topic "finishing" 335, worker "publishing" 364 for topic "publishing" 340, and worker "published" 366 for topic "published" 345.

The system 300 includes a request database 380 (not show explicitly in FIG. 3) that stores, inter alia, a fulfillment status indicator denoting an extent to which an API service request has been fulfilled. The request database 380 is depicted in FIG. 12, described infra, which shows that all of the workers in FIG. 3 are connected, by a wired or wireless connection, to the request database 380.

The client entity 310 is defined as a client application in a computer or a user who uses or controls a client application.

In one embodiment, the client entity 310 runs in an Internet zone.

In one embodiment, the client entity 310 runs in an intranet zone.

The worker "head" 315 is a worker identified as "head" or HEAD. A "worker" is, by definition, executable software code.

Figure 4:
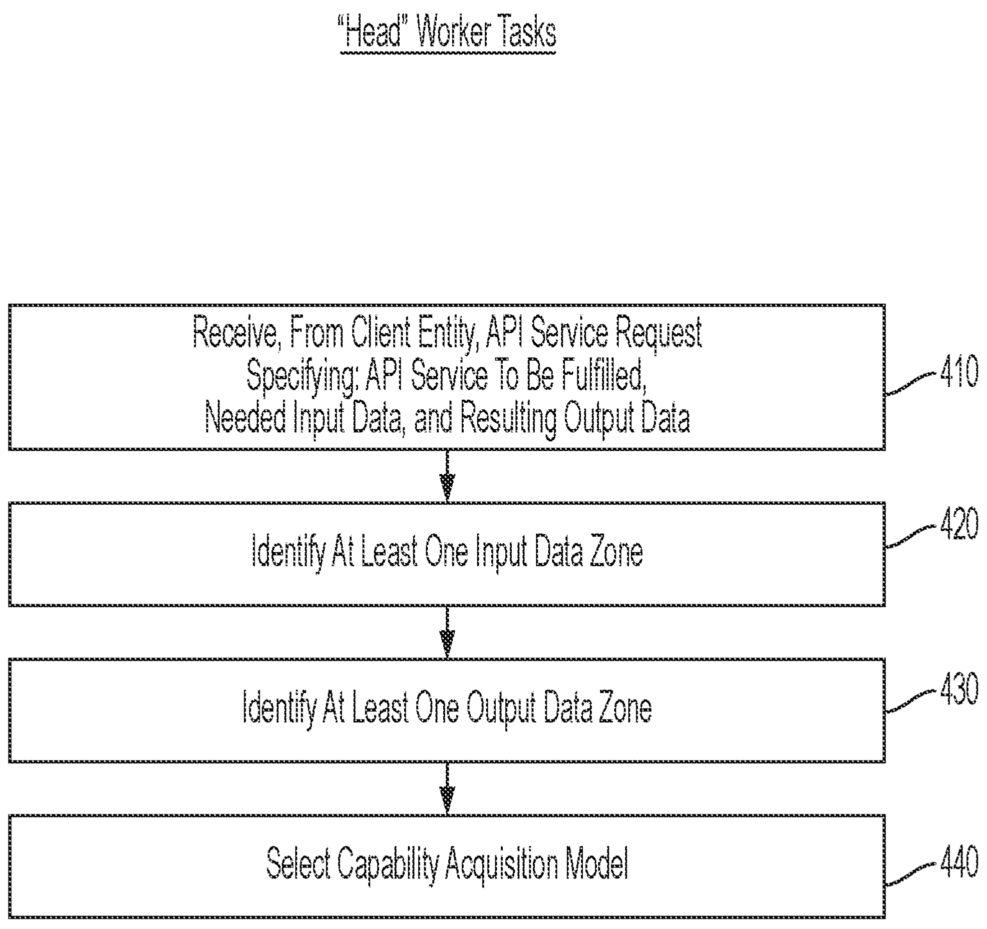
FIG. 4 is a flow chart depicting tasks performed by a worker "head", in accordance with embodiments of the present invention.
Figure 5:
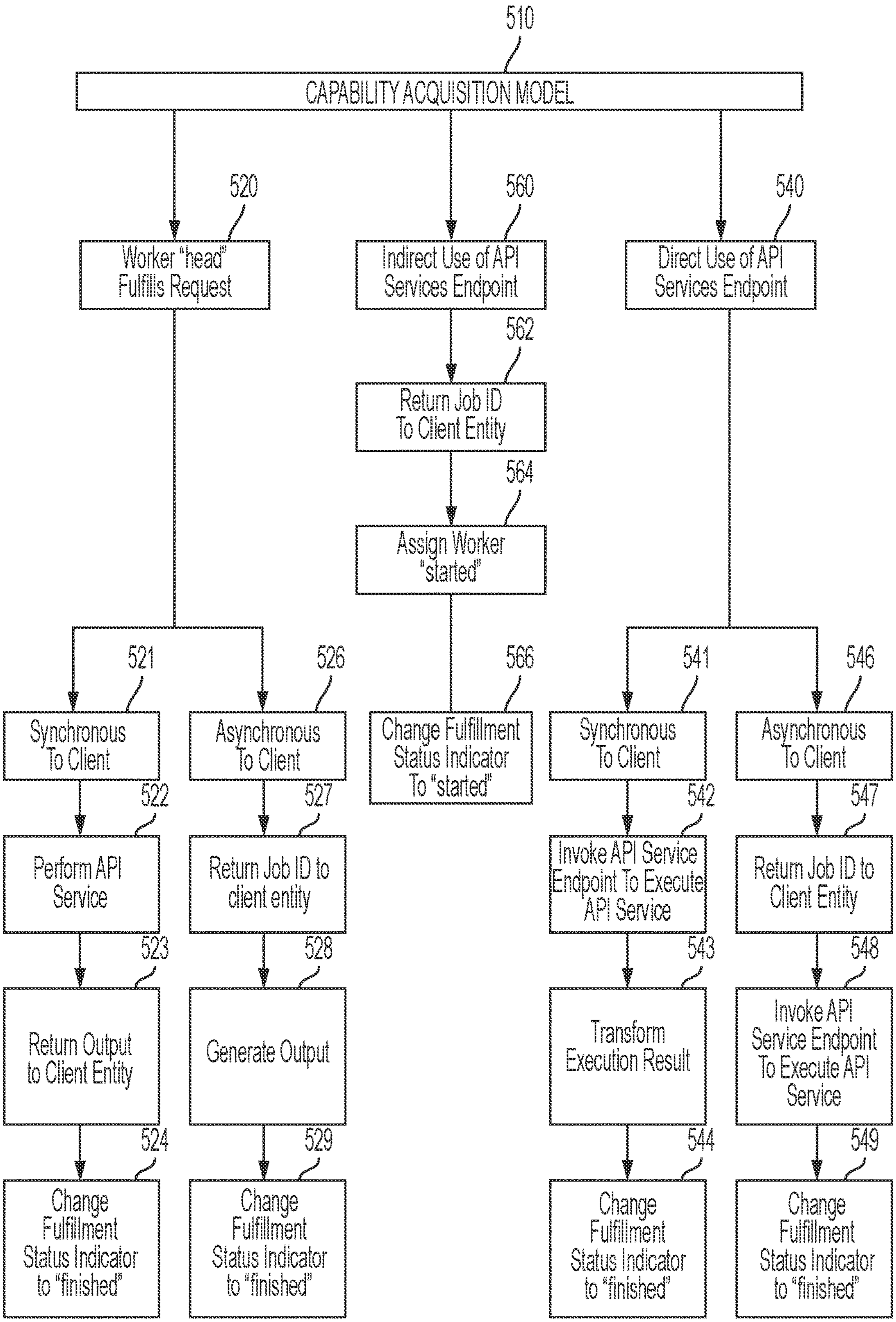
FIG. 5 is a diagram depicting capability acquisition models which may be determined and used for fulfilling an API service request, in accordance with embodiments of the present invention.

The tasks performed by the worker "head" 315 are depicted in FIGS. 4 and 5, discussed infra.

Embodiments of the present invention describe sequentially implemented pub/sub zone-based messaging topics in terms of security/compliance requirements, by which every fulfillment state change results in posting a "pub" message to a zone-based pub/sub topic, which, in turn, results in executing a qualified topic subscriber to complete the assigned service-dependent fulfillment task.

Generally, each current worker: (i) completes the tasks that the current worker is responsible for performing as required by the current topic; (ii) updates a fulfillment status indicator, in the request database 380, denoting an extent to which the API service request has been fulfilled, and (iii) assigns a next worker to a next topic by posting a next message to the next topic, unless the updated fulfillment status indicator is "finished" (i.e., the API service request has been totally fulfilled). One or more workers subscribed to the next topic to which the next message is posted begin performing the tasks required by the next topic.

Figure 6:
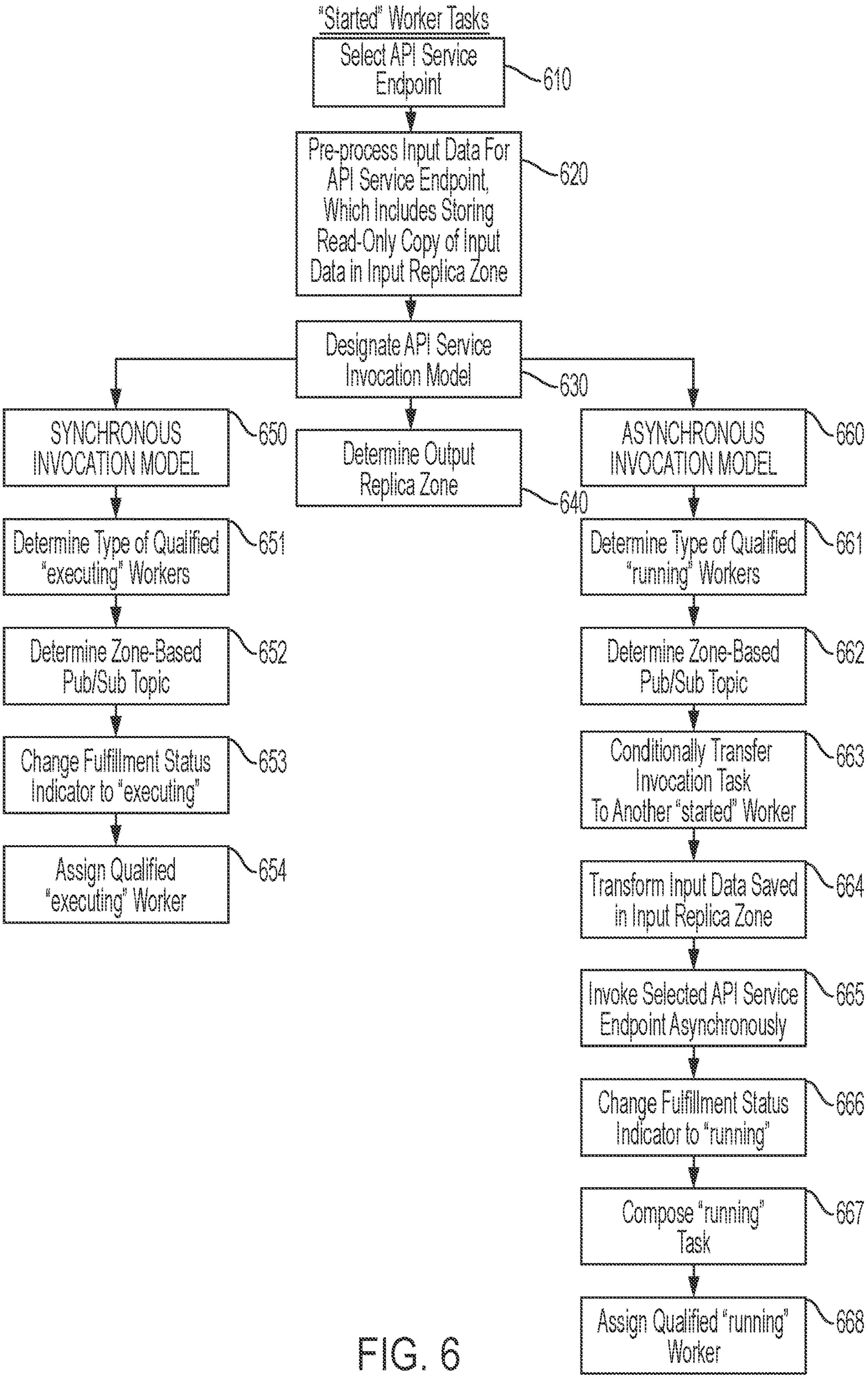
FIG. 6 is a flow chart depicting tasks performed by a worker "started" for a topic "started", in accordance with embodiments of the present invention.

More specifically, the worker "head" 315 posts 321 a message to topic "started" 320, resulting in assignment of the worker "started" 361 to perform the tasks required by the topic "started" 320. The tasks performed by the worker "started" 361 are depicted in FIG. 6, discussed infra.

An API service endpoint invocation model is either a synchronous invocation model or an asynchronous invocation model.

Figure 7:
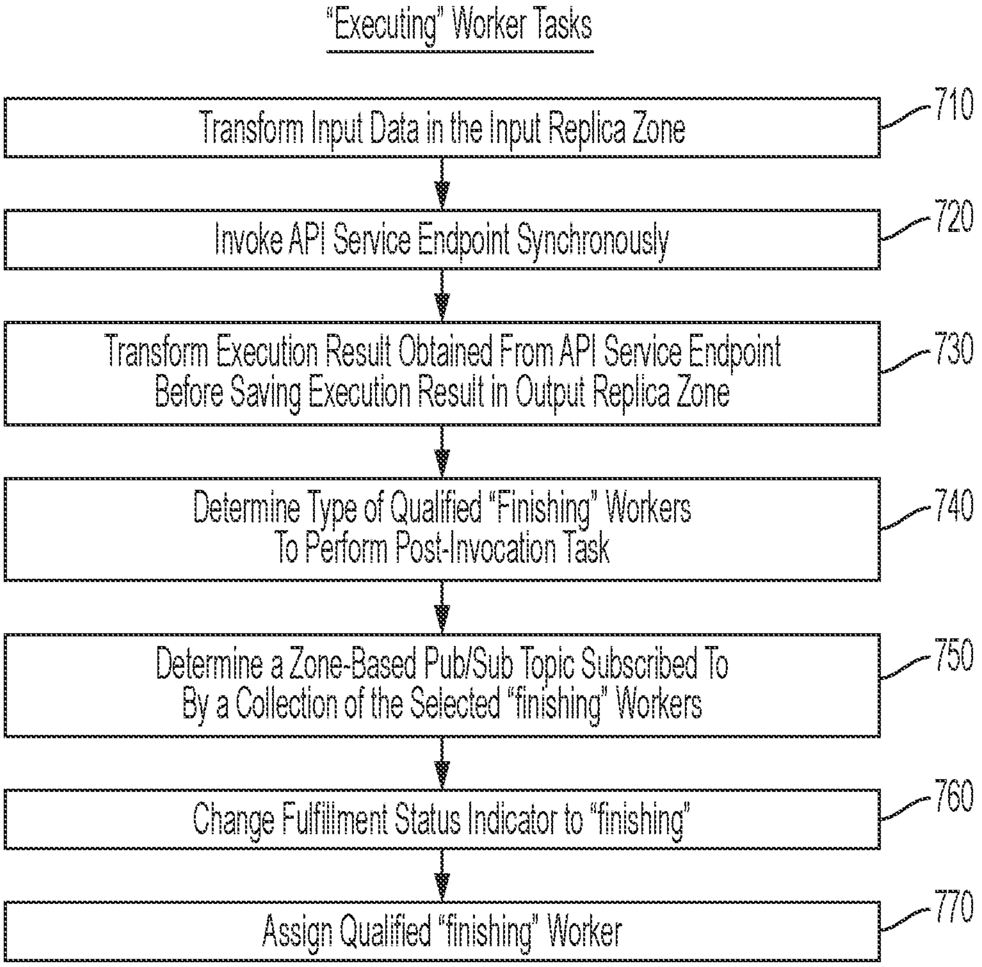
FIG. 7 is a flow chart depicting tasks performed by a worker "executing" for a topic "executing", in accordance with embodiments of the present invention.

If the invocation model of the selected API service endpoint is synchronous then the worker "started" 361 posts 331 a message to topic "executing" 330, resulting in assignment of the worker "executing" 365 to perform the tasks required by the topic "executing" 330. The tasks performed by the worker "executing" 365 are depicted in FIG. 7, discussed infra.

Figure 9:
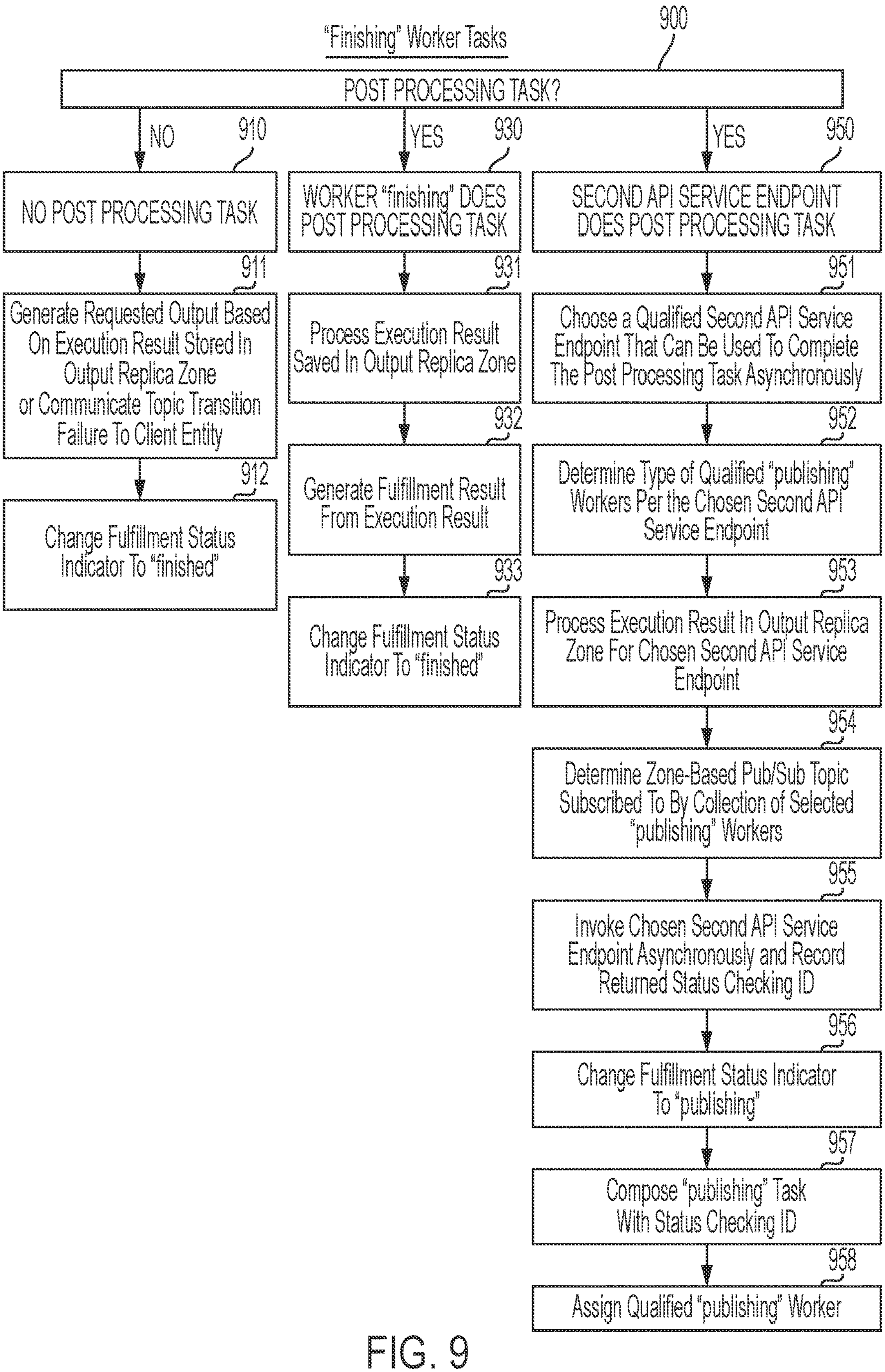
FIG. 9 is a flow chart depicting tasks performed by a worker "finishing" for topic "finishing", in accordance with embodiments of the present invention.

The worker "executing" 365 posts 337 a message to topic "finishing" 335, resulting in assignment of the worker "finishing" 363 to perform the tasks required by the topic "finishing" 335. The tasks performed by the worker "finishing" 363 are depicted in FIG. 9 discussed infra, including obtaining an execution result from an API service endpoint who executes the API service.

Figure 8:
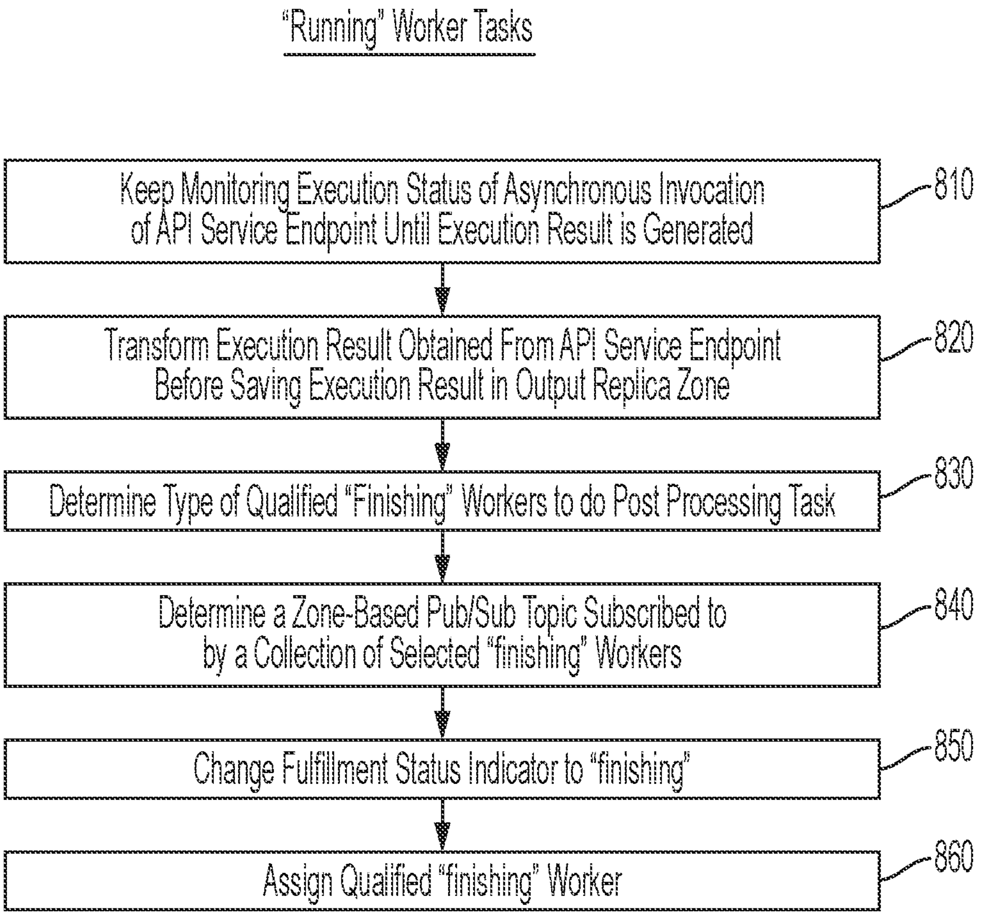
FIG. 8 is a flow chart depicting tasks performed by a worker "running" for a topic "running", in accordance with embodiments of the present invention.

If the invocation model of the selected API service endpoint is asynchronous then the worker "started" 361 posts 326 a message to topic "running" 325, resulting in assignment of the worker "running" 362 to perform the tasks required by the topic "running" 325. The tasks performed by the worker "running" 325 are depicted in FIG. 8, discussed infra.

The worker "running" 362 posts 336 a message to topic "finishing" 325, resulting in assignment of the worker "finishing" 363 to perform the tasks required by the topic "finishing" 335. The tasks performed by the worker "finishing" 363 are depicted in FIG. 9 discussed infra, including obtaining an execution result from the API service endpoint who performed the API service.

In one embodiment, a post processing task is performed on the execution result. Performance of the post processing task generates a post processing result.

Examples of post processing tasks include, inter alia: changing a form or format of the execution result such from a text or numerical format to a graphic image; performing a postprocessing calculation using the execution result as input; making a decision based on the execution result; etc.

If there is no post processing task to be performed or if there is a post processing task to be performed by the worker "finishing" 363, then the worker "finishing" 363 will not post a task to another topic and will end the method of FIG. 3 by changing the fulfillment status indicator to "finished" in the request database 380. The fulfillment status indicator of "finished" denotes that the API service request has been totally fulfilled.

If there is a post processing task to be performed (e.g., by a second API service endpoint), then the worker "finishing" 363 posts 341 a message to topic "publishing" 340, resulting in assignment of the worker "publishing" 364 to perform the tasks required by the topic "publishing" 340. The tasks performed by the worker "finishing" 363 are depicted in FIG. 9 discussed infra.

Figure 10:
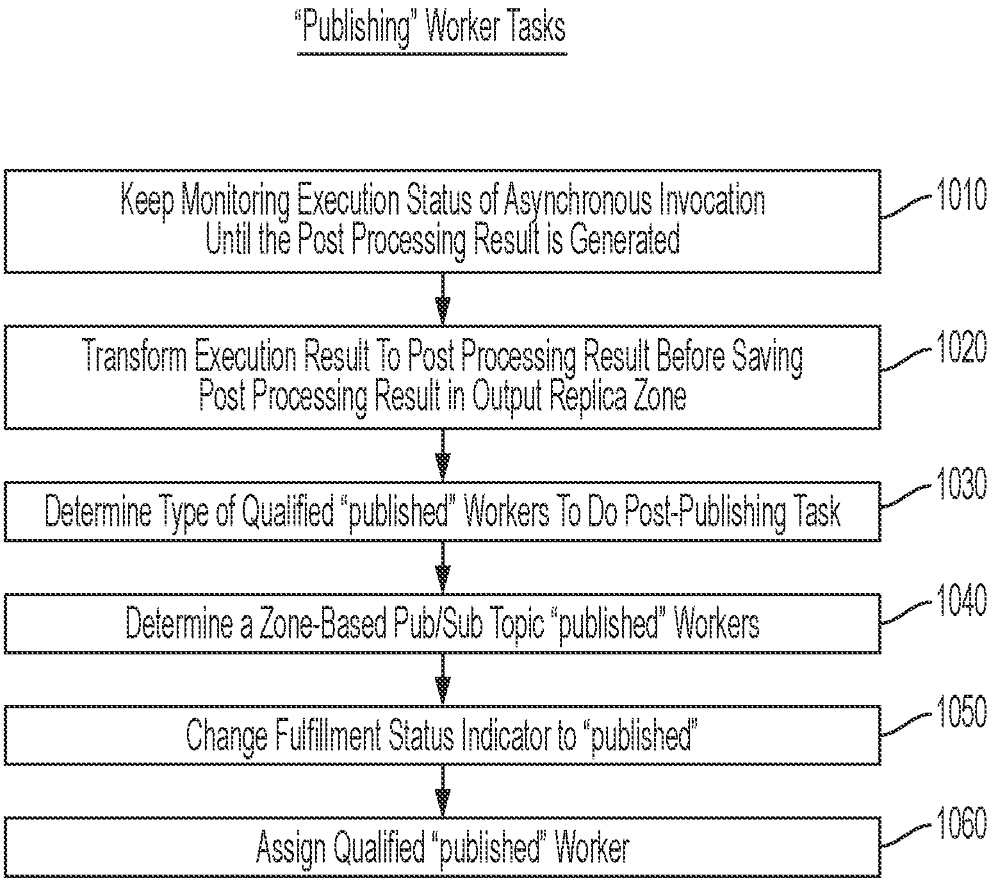
FIG. 10 is a flow chart depicting tasks performed by a worker "publishing" for a topic "publishing", in accordance with embodiments of the present invention.

The worker "publishing" 340 posts 346 a message to topic "published" 345, resulting in assignment of the worker "published" 366. The tasks performed by the worker "publishing" 340 are depicted in FIG. 10 discussed infra.

Figure 11:
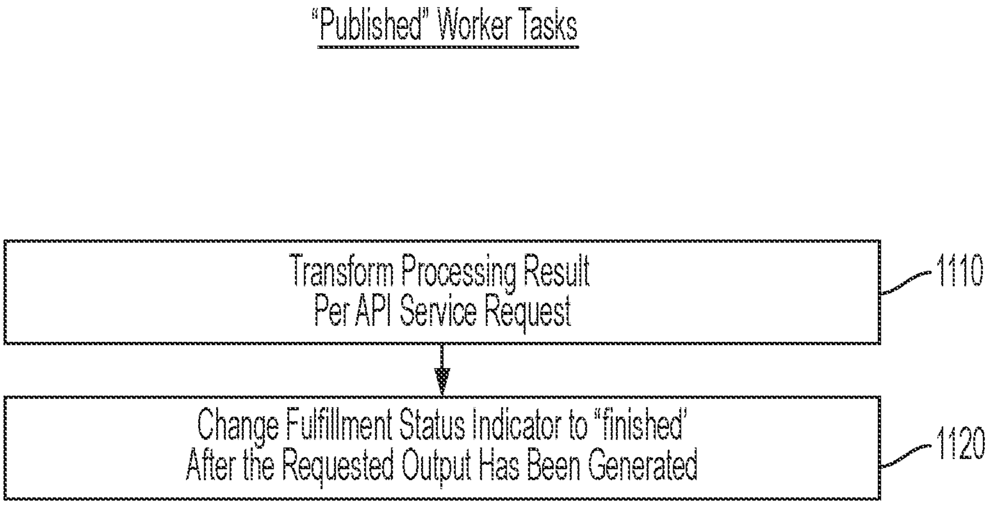
FIG. 11 is a flow chart depicting tasks performed by a worker "published" for a topic "published", in accordance with embodiments of the present invention.

The worker "published" 366 changes the fulfillment status indicator to "finished" in the request database 380, which ends the method of FIG. 3. The tasks performed by the worker "published" 366 are depicted in FIG. 11 discussed infra.

FIG. 3 includes error correction mechanisms 371-376 to change one worker to another worker to solve a worker-related problem.

An example for use of correction mechanisms 371-376 is a scenario in which the worker "started" 361 cannot perform a task due to being unable to satisfy a zone constraint for performing a task required by topic "started" 320. In one embodiment, correction mechanism 371 replaces the worker "started" 361 by another "started" worker subscribed to the topic "started" 320, wherein the other "started" worker is executed in a zone other than the zone in which the replaced "started" worker 361 is executed and is able to satisfy the zone constraint.

Another example for use of correction mechanisms 371-376 is a scenario in which the worker "started" 361 cannot perform a task due to a hardware error existing in the zone in which the worker "started" 361 executes. Correction mechanism 371 replaces the worker "started" 361 by another "started" worker subscribed to the topic "started" 320, wherein the other "started" worker is executed in a zone other than the zone in which the replaced "started" worker 361 is executed and the hardware error does not exist in the other zone.

Although in the preceding examples, the correction mechanism 371 replaces the worker "started" 361 by another "started" worker subscribed to the topic "started" and executing in another zone, there are scenarios in which the correction mechanism 371 replaces the worker "started" 361 by another "started" worker subscribed to the topic "started" and executing in the same zone. For example, the worker "started" 361 may be unable to perform a task due to a software bug (i.e., error) in the program code of the worker "started" 361, where the software bug is unrelated to the zone in which the worker "started" 361 executes. In this example, the correction mechanism 361 can replace the worker "started" 361 by another "started" worker subscribed to the topic "started" regardless of the zone that the other worker executes in. Thus, in one embodiment, the replacement "started" worker can be executed in the same zone as the zone in which the replaced worker is executed.

The preceding discussion pertaining to correction mechanism 371 is likewise applicable to correction mechanisms 372-376 with respect to topics "running" 325, "finishing" 335, "publishing" 340, "executing" 330, and "published 345, respectively.

Next presented are descriptions of tasks performed by the worker "head" 315, the worker "started" 361, the worker "executing" 365, the worker "running" 362, the worker "finishing" 363, the worker "publishing" 364, and the worker "published" 366.

"Head" Worker Tasks

FIG. 4 is a flow chart depicting tasks performed by the worker "head" 315, in accordance with embodiments of the present invention. The flow chart of FIG. 4 includes steps 410-440.

In step 410, the worker "head" 315 receives, from the client entity 310, an API service request specifying: an API service to be fulfilled, input data needed to perform the API service, and output data which will result from fulfilling the API service.

In step 420, the worker "head" 315 identifies at least one input data zone containing the input data specified in the API request. In one embodiment, identifying an input data zone comprises specifying an address of, or a link to, the input data zone.

In step 430, the worker "head" 315 identifies at least one output data zone in which the output data specified in the API request is to be stored. In one embodiment, identifying an output data zone comprises specifying an address of, or a link to, the output data zone.

In step 440, the worker "head" 315 selects a capability acquisition model to be used for fulfilling the API service request.

FIG. 5 is a diagram depicting capability acquisition models which may be determined and used for fulfilling the API service request, in accordance with embodiments of the present invention.

The capability acquisition model 510 may be a model 520 in which the worker "head" 315 fulfills the request without assistance from an API service endpoint, in a modality 521 that is synchronous to the client entity 310 in real time or in a modality 526 that is asynchronous to the client entity 310.

If the synchronous modality 521 applies, then in step 522 the worker "head" 315 performs the API service, after which in step 523 the worker "head" 315 returns the output, from performance of the API service to the client entity 310. In step 524, the worker "head" 315 changes a fulfillment status indicator to "finished" in the request database 380.

The fulfillment status indicator indicates to which the API service request has been fulfilled, wherein "finished" indicates that the API service request is completely fulfilled.

If the asynchronous modality 526 applies, then in step 527 the worker "head" 315 returns a Job ID to the client entity 310 so that the client entity 310 can keep track of the fulfillment status indicator. In step 528, after performing the API service, the output from performance of the API service is generated. In step 529, the worker "head" 315 changes the fulfillment status indicator to "finished" in the request database 380.

The capability acquisition model 510 may be a model 540 which makes direct use of an API service endpoint for executing the API service, in a modality 541 that is synchronous to the client entity 310 or in a modality 546 that is asynchronous to the client entity 310.

If the synchronous modality 541 applies, then in step 542, the worker "head" 315 invokes the API service endpoint to execute the API service. In one embodiment, the API service request requires a specified transformation of the execution result from the API service endpoint, in which case the worker "head" 315 performs, in step 543, the specified transformation of the execution result. In step 544, the worker "head" 315 changes the fulfillment status indicator to "finished" in the request database 380 after returning the fulfillment result to the client entity 310.

In one embodiment of the synchronous modality 541, the API service request requires a specified transformation of the output from performance of the API service, in which case the worker "head" 315 performs the specified transformation before changing the fulfillment status indicator to "finished" in the request database 380.

If the asynchronous modality 546 applies, then the worker "head" 315 in step 547 returns a Job ID to the client entity 310 so that the client entity 310 can keep track of the fulfillment status indicator. In step 548, the worker "head" 315 invokes the API service endpoint to execute the API service. In one embodiment, the API service request requires a specified transformation of the execution result from the API service endpoint, in which case the worker "head" 315 performs, in step 548, the specified transformation of the execution result. In step 549, the worker "head" 315 changes the fulfillment status indicator to "finished" in the request database 380 after the fulfillment result is generated for the client entity 310.

In one embodiment of the asynchronous modality 546, the API service request requires a specified transformation of the output from performance of the API service, in which case the worker "head" 315 performs the specified transformation before changing the fulfillment status indicator to "finished" in the request database 380.

The capability acquisition model 510 may be a model 560 which makes indirect use of an API service endpoint for performing the API Service, by performing steps 562, 564, and 566.

In step 562, the worker "head" 315 returns a Job ID to the client entity 310 so that the client entity 310 can keep track of the fulfillment status indicator.

In step 564, the worker "head" 315 determines, in one embodiment, a type of qualified "started" workers to select an API service endpoint and assigns a qualified "started" worker 361 to perform the tasks required by the topic "started" 320.

In step 566, the worker "head" 315 changes the fulfillment status indicator to "started" in the request database 380 upon completion of performance of the tasks required of the worker "head" 315.

Step 564 in FIG. 5 is implemented by the worker "head" 315 in FIG. 3 by assigning the worker "started" 361 who is qualified to access the input data from the input data zones. The assignment of the worker "started" 361 is accomplished by the worker "head" 315 by posting, using the sub/sub messaging system, a message to the topic "started" 320, resulting in activation of worker "started" 361 who is a subscriber to the topic "started" 320. The worker "started" 361 is qualified for performing all zone-limiting tasks pertaining to the topic "started" 320.

"Started" Worker Tasks

FIG. 6 is a flow chart depicting tasks performed by the worker "started" 361 for topic "started" 320, in accordance with embodiments of the present invention.

The worker "started" 361 can access the input data from within the API service zone of the worker "started" 361.

In step 610, the worker "started" 361 selects a qualified API service endpoint configured to execute the API service.

In step 620 in one embodiment, the worker "started" 361 pre-processing the input data for the selected API service endpoint, which includes storing a read-only copy of the input data into an input replica zone for the selected API service endpoint.

In step 630, the worker "started" 361 designates an API service invocation model supported by the selected API service endpoint. The API service invocation model is either a synchronous invocation model 650 or an asynchronous invocation execution model 660, with respect to interactions between the API service endpoint and the workers in the system 300.

In step 640, the worker "started" 361 determines an output replica zone for saving the execution result.

If the synchronous invocation model 650 is designated, then the worker "started" 361 performs steps 651-654.

In step 651, the worker "started" 361 determines the type of qualified "executing" workers that can do the synchronous API service endpoint execution task.

In step 652 in one embodiment, the worker "started" 361 determines a zone-based pub/sub-topic that is subscribed to by a collection of selected "executing" workers.

In step 653 in one embodiment, the worker "started" 361 changes the fulfillment status indicator to "executing" in the request database 380.

In step 654, the worker "started" 361 assigns a qualified "executing" worker 365 to do the API service endpoint invocation task, by posting a message to the pub/sub topic "executing" 330.

Thus, in summary with the API service invocation model being the synchronous invocation model 650, worker "started" 361 assigns the worker "executing" 365 to perform the tasks required by the topic "executing" 330. The assignment of worker "executing" 365 is accomplished by the worker "started" 361 by posting, using the sub/sub messaging system, a message to the topic "executing" 330, resulting in activation of worker "executing" 365 who is a subscriber to the topic "executing" 330. The worker "executing" 365 is qualified for performing all zone-limiting tasks pertaining to the topic "executing" 330. The worker "started" 361 changes the fulfillment status indicator to "executing" in the request database 380 upon completion of performance of the tasks required of the worker "started" 361.

If the asynchronous invocation model 660 is designated, then the worker "started" 361 performs steps 661-668.

In step 661, the worker "started" 361 determines the type of qualified "running" workers that can complete the asynchronous API service endpoint execution task.

In step 662 in one embodiment, the worker "started" 361 determines a zone-based pub/sub-topic that is subscribed to by a collection of selected "running" workers.

In step 663, if the worker "started" 361 cannot invoke the selected API service endpoint, the API service endpoint invocation task is transferred to another qualified "started" worker using the correction mechanism 371 (see FIG. 3).

In step 664 in one embodiment, the worker "started" 361 transforms the input data saved in the input replica zone before invoking the selected API service endpoint.

In step 665, the worker "started" 361 invokes the selected API service endpoint asynchronously and records the returned status checking ID.

In step 666, the worker "started" 361 changes the fulfillment status indicator to "running" in the request database 380.

In step 667, the worker "started" 361 composes a "running" task with the status checking ID.

In step 668, the worker "started" 361 assigns a qualified "running" worker 362 to complete the API service endpoint invocation task, by posting a message to the topic "running" 325.

Thus in summary with the API service invocation model being the asynchronous invocation model 660, worker "started" 361 assigns the worker "running" 362 to perform the tasks required by the topic "running" 325. The assignment of the worker "running" 362 is accomplished by the worker "started" 361 by posting, using the sub/sub messaging system, a message to the topic "running" 325, resulting in activation of worker "running" 362 who is a subscriber to the topic "running" 325. The worker "running" 362 is qualified for performing all zone-limiting tasks pertaining to the topic "running" 325. The worker "started" 361 changes the fulfillment status indicator to "running" in the request database 380 upon completion of performance of the tasks required of the worker "started" 361.

"Executing" Worker Tasks

FIG. 7 is a flow chart depicting tasks performed by the worker "executing" 365 for topic "executing" 330, in accordance with embodiments of the present invention. The flow chart of FIG. 7 includes steps 710-770.

The worker "executing" 365 can invoke the API service endpoint synchronously from within the API service zone of the worker "executing" 365.

In one embodiment, step 710 transforms the input data in the input replica zone before invoking the API service endpoint.

Step 720 invokes the API service endpoint synchronously.

In one embodiment, step 730 transforms the execution result obtained from the API service endpoint before saving the execution result in the output replica zone.

Step 740 determines the type of qualified "finishing" workers to perform a post processing task.

In one embodiment, step 750 determines a zone-based pub/sub topic that is subscribed to by a collection of selected "finishing" workers.

Step 760 changes the fulfillment status indicator to "finishing" in the request database 380.

Step 770 assigns a qualified "finishing" worker 363 to perform the tasks required by the topic "finishing" 335, by posting a message to the topic "finishing" 335.

"Running" Worker Tasks

FIG. 8 is a flow chart depicting tasks performed by the worker "running" 362 for topic "running" 325, in accordance with embodiments of the present invention. The flow chart of FIG. 8 includes steps 810-860.

The worker "running" 362 can invoke the API service endpoint asynchronously from within the API service zone of the worker "running" 362.

Step 810 keeps monitoring the execution status of the asynchronous invocation of the API service endpoint until the execution result is generated by the API service endpoint.

In one embodiment, step 820 transforms the execution result obtained from the API service endpoint before saving the execution result in the output replica zone.

Step 830 determines the type of qualified "finishing" workers to perform a postprocessing task.

In one embodiment, step 840 determines a zone-based pub/sub topic that is subscribed to by a collection of selected "finishing" workers.

Step 850 changes the fulfillment status indicator to "finishing" in the request database 380.

Step 860 assigns a qualified "finishing" worker 363 to perform the tasks required by the topic "finishing" 335, by posting a message to the topic "finishing" 335.

"Finishing" Worker Tasks

FIG. 9 is a flow chart depicting tasks performed by the worker "finishing" 363 for topic "finishing" 335, in accordance with embodiments of the present invention.

The worker "finishing" 363 can access the output replica zone from within the API service zone of the worker "finishing" 363.

The flow chart of FIG. 9 decides 900 whether there is a post processing task to be performed. There are three scenarios concerning the post processing task: scenario 910 for which there is no post processing task to perform, scenario 930 for which the worker "finishing" performs a post processing, and scenario 950 for which a second API service endpoint performs a post processing task.

With scenario 910 (no post processing task), the worker "finishing" 363 performs tasks 911-912.

Step 911 generates the requested output based on the execution result stored in the output replica zone if the sequential topic processing was successful (i.e., all transitions between topics are normal and the topic processing ended in the normal state 251), or communicate to client entity 310 that the sequential topic processing was unsuccessful (i.e., a transition between topics is abnormal and the topic processing ended in the failed state 252), as discussed supra in relation to FIG. 2.

Step 912 changes the fulfillment status indicator to "finished" in the request database 380 following completion of successful topic processing or following completion of unsuccessful topic processing.

With scenario 930 (worker "finishing" performs post processing task), the worker "finishing" 363 performs steps 931-933.

In one embodiment, step 931 processes the execution result saved in the output replica zone.

Step 932 generates the fulfillment result from the execution result.

Step 933 changes the fulfillment status indicator to "finished" in the request database 380.

With scenario 950 (second API service endpoint performs post processing task), the worker "finishing" 363 performs tasks 951-958.

Step 951 chooses a qualified second API service endpoint that can be used to complete the data post processing task asynchronously.

Step 952 determines the type of qualified "publishing" workers per the chosen second API service endpoint.

In one embodiment, step 953 processes the execution result in the output replica zone for the chosen second API service endpoint.

In one embodiment, step 954 determines a zone-based pub/sub topic that is subscribed to by a collection of the selected workers.

Step 955 invokes the chosen second API service endpoint asynchronously and records the returned status checking ID.

Step 956 changes the fulfillment status indicator to "publishing" in the request database 380.

Step 957 composes a "publishing" task with the status checking ID.

Step 957 assigns a qualified "publishing" worker 364, by posting a message to the topic "publishing" 340.

"Publishing" Worker Tasks

FIG. 10 is a flow chart depicting tasks performed by the worker "publishing" 364 for topic "publishing" 340, in accordance with embodiments of the present invention. The flow chart of FIG. 210 includes steps 1010-1060.

The worker "publishing" 364 can invoke the second API service endpoint asynchronously from within the API service zone of the worker "publishing" 364.

Step 1010 keeps monitoring the execution status of the asynchronous invocation until the post processing result is generated.

In one embodiment, step 1020 transforms the execution result to the post processing result before saving the post processing result in the output replica zone.

Step 1030 determines the type of qualified "published" workers to do the post processing task.

In one embodiment, step 1040 determines a zone-based pub/sub topic subscribed to by a collection of the selected "published" workers.

Step 1050 changes the fulfillment status indicator to "published" in the request database 380.

Step 1060 assigns a qualified "published" worker 366, by posting a message to the pub/sub topic "published" 345.

"Published" Worker Tasks

FIG. 11 is a flow chart depicting tasks performed by the worker "published" 366 for topic "published" 345, in accordance with embodiments of the present invention. The flow chart of FIG. 11 includes steps 1110-1120.

The worker "published" 366 can access the output replica zone from within the API service zone of the worker "published" 366.

In one embodiment, step 1110 transforms the post processing result per the API service request Step 1120 changes the fulfillment status indicator to "finished" in the request database 380 after the requested output has been generated.

Request Database

FIG. 12 depicts a request database 380 and workers connected to the request database 380, in accordance with embodiments of the present invention. The workers of worker "head" 315, worker "started" 361, worker "executing" 365, worker "running" 362, worker "finishing"363, worker "publishing" 364, and worker "published" 366 are each independently connected to the request database 380 by a wired or wireless connection. The fulfillment status indicator is stored in the request database 380.

Use Cases

Table 1 summarizes five use cases (A-E) derived from FIG. 3.

TABLE 1

| Use Case | Fulfillment To Client Entity | Worker Execution | Post Processing Task? |
|---|---|---|---|
| A | Synchronous in real time | | |
| B | Asynchronous | Asynchronous | No |
| C | Asynchronous | Asynchronous | Yes |
| D | Asynchronous | Synchronous | No |
| E | Asynchronous | Synchronous | Yes |

Three parameters in Table 1 define each use case of use cases A-E: (i) Fulfillment To Client Entity which denotes whether fulfillment of the API service is synchronous or asynchronous to the client entity; (ii) Worker Execution which denotes whether interactions between the API service endpoint and the workers are synchronous or asynchronous; and (iii) Post Processing Task which denotes whether or not a post processing task is performed.

FIGS. 13-17 depict use cases A-E, respectively, in accordance with embodiments of the present invention.

Figure 13:
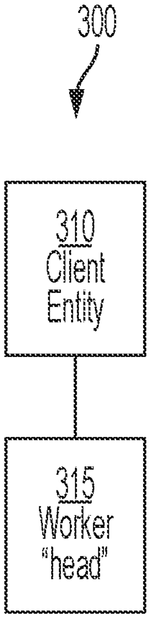
FIGS. 13-17 depict use cases, in accordance with embodiments of the present invention.

FIG. 13 depicts the use case A in which fulfillment of the API service is synchronous to the client entity 310 in real time and corresponds to the capability acquisition model 520 in FIG. 5 in which the worker "head" 315 fulfills the request without assistance from an API service endpoint in a modality 521 (see FIG. 5) that is synchronous to the client entity 310 in real time.

Figure 14:
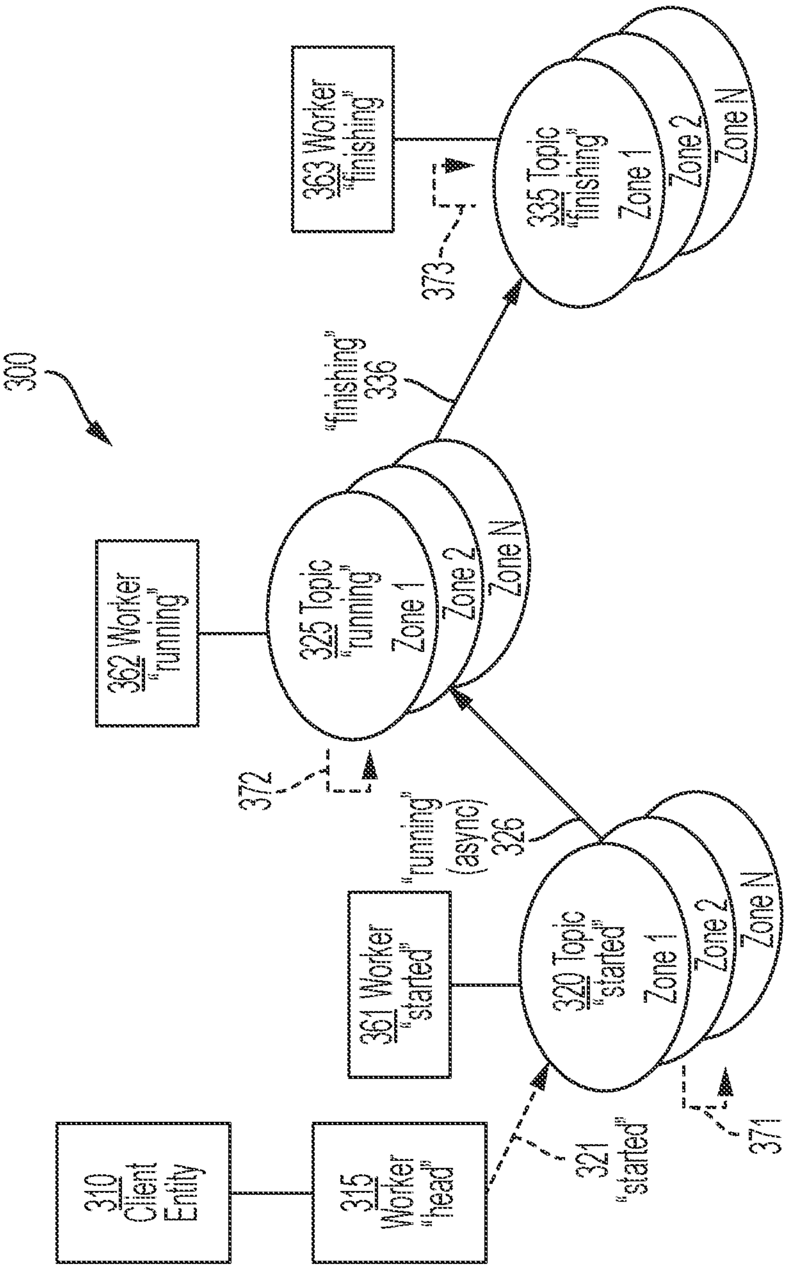

FIG. 14 depicts the use case B in which fulfillment of the API service is asynchronous to the client entity, with asynchronous worker execution, and with no post processing task performance. The client entity 310 issues a request for creating a data collection in the system so that the data can be used in other API service requests. The worker "head" 315 assigns a qualified "started" worker considering the input data zones. The worker "started" 361 fetches input data files/objects from within the API service zone of the worker "started" 361, determines a collection service that can be used to perform the collection asynchronously, makes the first invocation to the collection service's API endpoint, and assigns a qualified "running" worker to complete the asynchronous invocation. The worker "running" 362 completes the assigned asynchronous task, saves the execution result in the output replica zone, and assigns a qualified "finishing" worker to do the post processing task. The worker "finishing" 363 generates the requested output based upon the execution result stored in the output replica zone and changes the fulfillment status indicator to "finished" in the request database 380.

Figure 15:
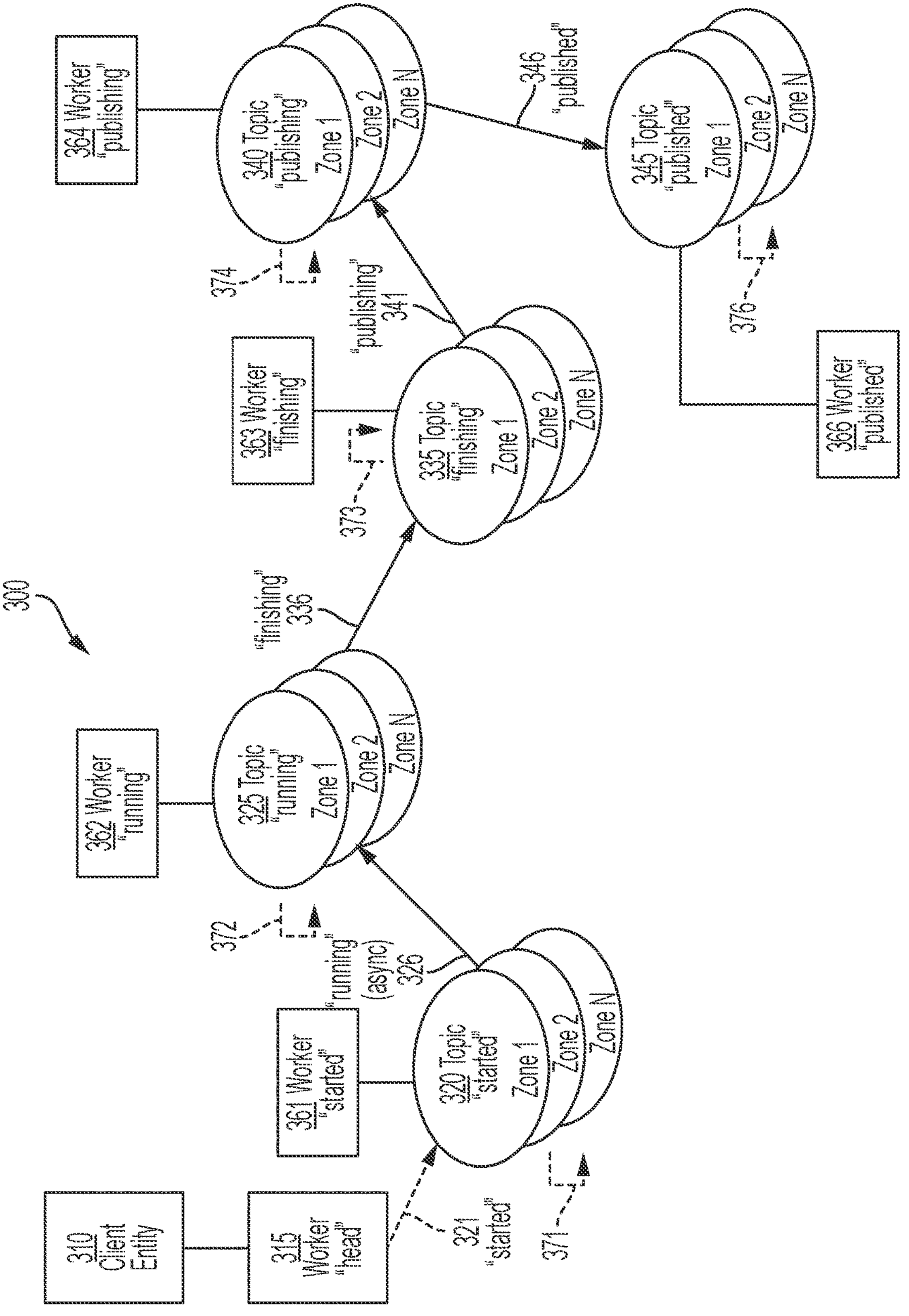

FIG. 15 depicts the use case C in which fulfillment of the API service is asynchronous to the client entity, with asynchronous worker execution, and with post processing task performance. The client entity 310 issues a request for creating a geospatial analysis using a set of satellite images and obtaining an image viewing Uniform Resource Locator (URL) as the output. The worker "head" 315 assigns a qualified "started" worker considering the input data zones. The worker "started" 361 fetches input files/objects from within the API service zone of the worker "started" 361, determines a geospatial analytics service that can be used to do the analysis task asynchronously, make the first invocation to the geospatial analytics service's API endpoint, and assign a qualified "running" worker to complete the asynchronous invocation. The worker "running" 362 completes the assigned asynchronous task, saves the execution result in the output replica zone, and assigns a qualified "finishing" worker to do the post processing task. The worker "finishing" 363 determines a data publishing service that can be used to generate an image viewing URL asynchronously, makes the first invocation to the data publishing service's API endpoint based upon contents of the output replica zone, and assigns a qualified "publishing" worker to complete the asynchronous invocation. The worker "publishing" 364 completes the assigned asynchronous task, saves the post processing result in the output replica zone, and assigns a qualified "published" worker to complete the post processing task. The worker "published" 366 generates the requested output based upon the post processing result stored in the output replica zone and changes the fulfillment status indicator to "finished" in the request database 380.

Figure 16:
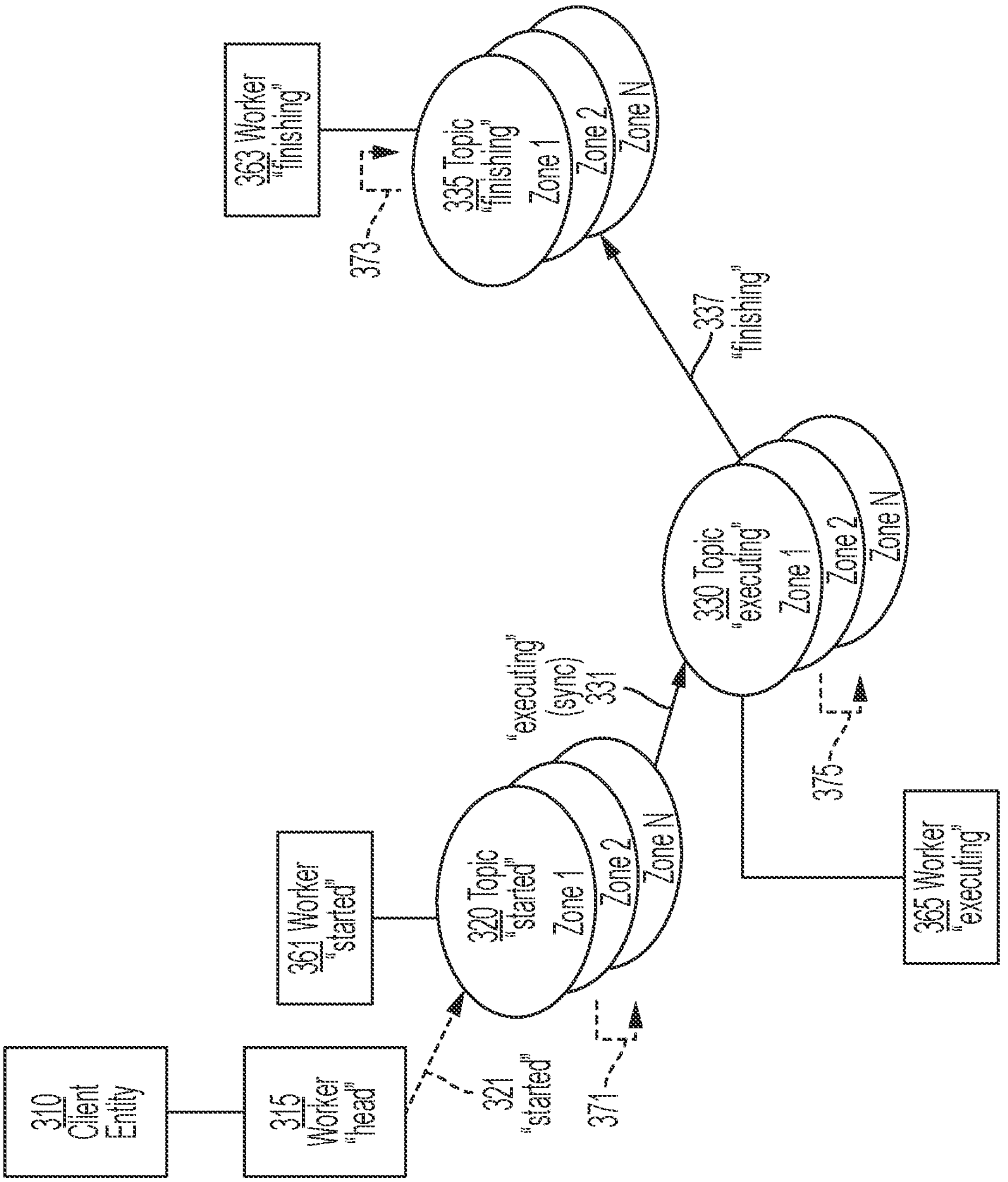

FIG. 16 depicts the use case D in which fulfillment of the API service is asynchronous to the client entity, with synchronous worker execution, and with no post processing task performance. The client entity 310 issues a request for classifying a collection of flowers with features of each of the flowers included in the input data. The worker "head" 315 assigns a qualified "started" worker considering the input data zones. The worker "started" 361 fetches input files/objects from within the API service zone of the worker "started" 361, determines a flower classification service that can be used to do the classification task synchronously, and assigns a qualified "executing" worker to invoke the flower classification service's API. The worker "executing" 365 does the assigned synchronous invocation based upon contents of the input replica zone, saves the execution result in the output replica zone, and assigns a qualified "finishing" worker to do the post processing task. The worker "finishing"363 generates the requested output based upon the execution result stored in the output replica zone and changes the fulfillment status indicator to "finished" in the request database 380.

Figure 17:
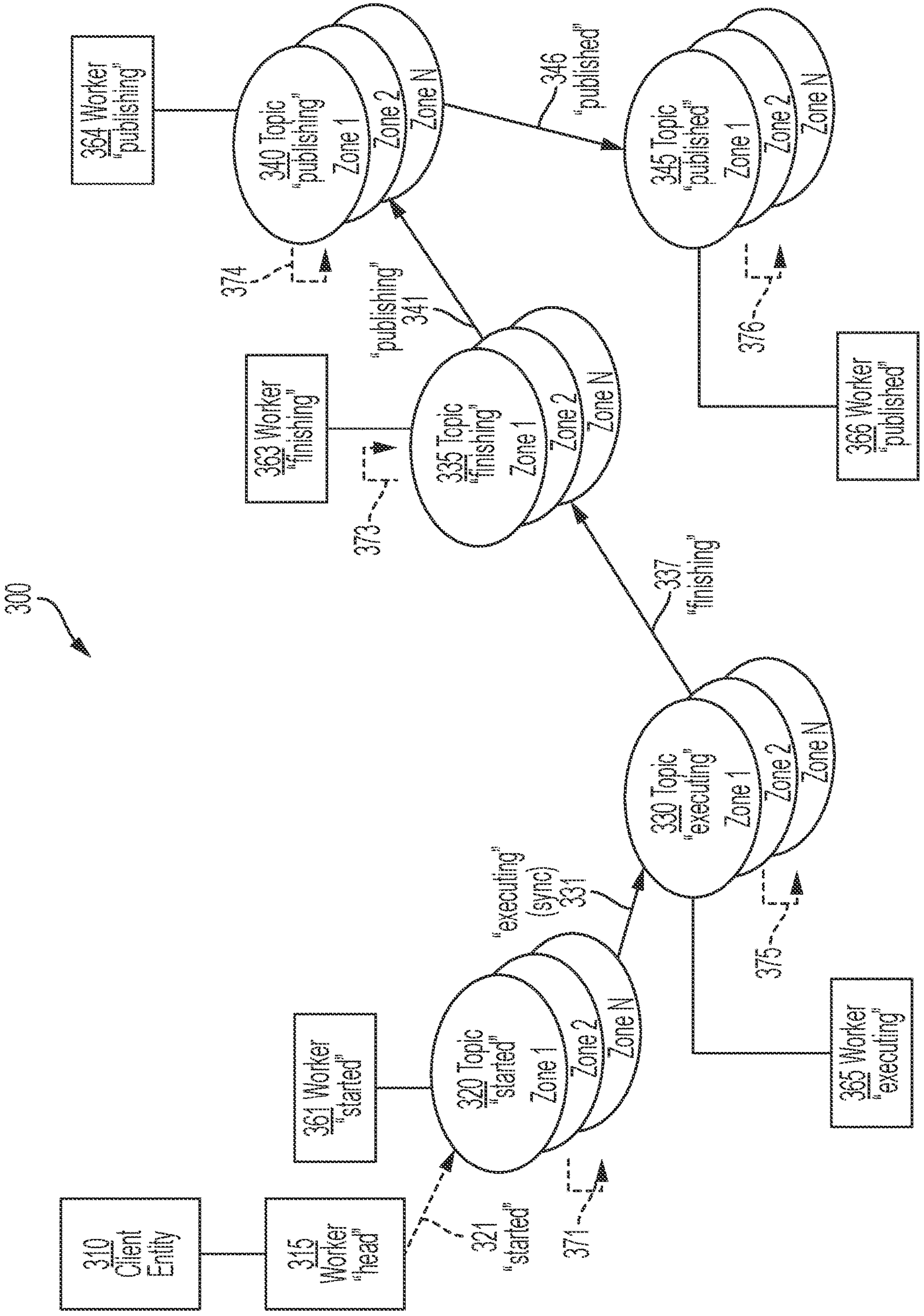

FIG. 17 depicts use the case E in which fulfillment of the API service is asynchronous to the client entity, with synchronous worker execution, and with post processing task performance. The client entity 310 issues a request for classifying a collection of flowers and obtaining an image viewing URL for the classification result. The worker "head" 315 assigns a qualified "started" worker considering the input data zones. The worker "started" 361 fetches input files/objects from within the API service zone of the worker "started" 361, determines a flower classification service that can be used to do the classification task synchronously, and assigns a qualified "executing" worker to invoke the flower classification service's API. The worker "executing" 365 does the assigned synchronous invocation based upon contents of the input replica zone, save the execution result in the output replica zone, assigns a qualified "finishing" worker to do the postprocessing task. The worker "finishing" 335 determines a data publishing service that can be used to generate an image viewing URL asynchronously, make the first invocation to the publishing service's API service endpoint based upon contents of the given output replica zone, and assign a qualified "publishing" worker to complete the asynchronous invocation. The worker "publishing" 364 completes the assigned asynchronous task, saves the execution result in the output replica zone, and assigns a qualified "published" worker to complete the post processing task. The worker "published" 366 generates the requested output based upon the execution result stored in the output replica zone and changes the fulfillment status indicator to "finished" in the request database 380.

Method for Performing an API Service

Figure 18:
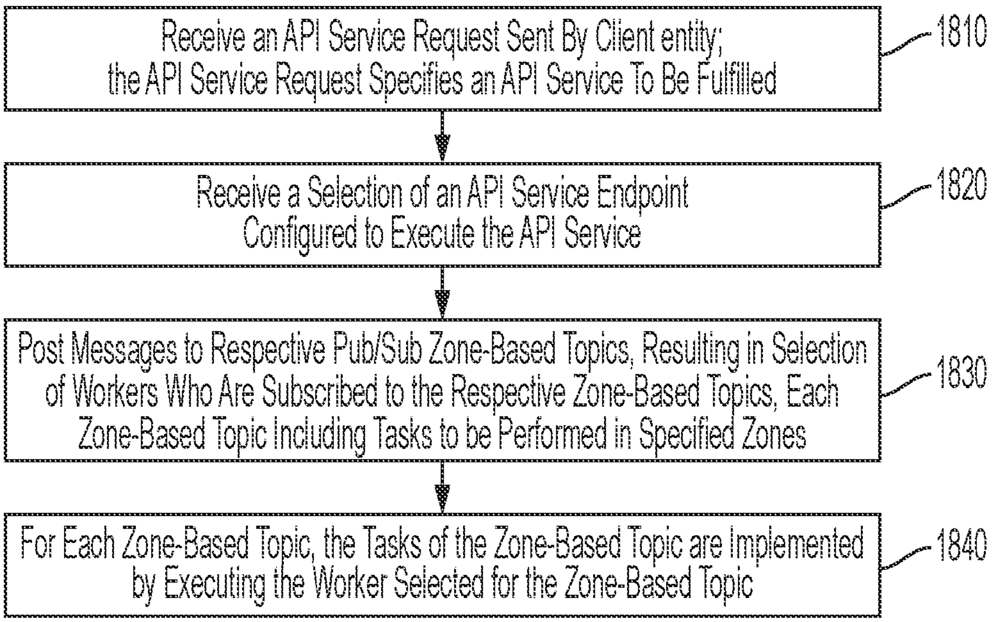
FIG. 18 is a flow chart describing a method for performing an Application Programming Interface (API) service via execution of tasks required by zone-based topics within a publish/subscribe (pub/sub) messaging infrastructure, in accordance with embodiments of the present invention.

FIG. 18 is a flow chart describing a method for performing an Application Programming Interface (API) service via execution of tasks required by zone-based topics within a publish/subscribe (pub/sub) messaging infrastructure, in accordance with embodiments of the present invention. The flow chart of FIG. 18 includes steps 1810-1840.

In step 1810, an API service request sent by a client entity is received. The API service request specifies an API service to be fulfilled.

In step 1820, a selection of an API service endpoint configured to execute the API service is received.

In step 1830, messages are posted to respective pub/sub zone-based topics of a sequence of zone-based topics, resulting in selection of workers who are subscribed to the respective zone-based topics. Each zone-based topic comprises one or more tasks to be performed in a specified one or more zones.

In step 1840, for each zone-based topic, the one or more tasks of the zone-based topic are implemented. Implementing the one or more tasks is performed by executing the worker selected for the zone-based topic.

The tasks of the zone-based topics include invoking the selected API service endpoint for the API service and making a fulfillment result of the API service available to the client entity.

In one embodiment, for each zone-based topic, the one or more tasks of the zone-based topic include a task to update a fulfillment status indicator denoting an extent to which the API service request has been fulfilled.

In one embodiment, a selection of an API service invocation model supported by the selected API service endpoint is received. Implementing the one or more tasks of the zone-based topic is in accordance with the designated API service invocation model. Invoking the API service endpoint is in accordance with the designated API service invocation model. The API service invocation model is either synchronous or asynchronous, with respect to interactions between the API service endpoint and the workers.

In one embodiment, the API service invocation model is the synchronous invocation model.

In one embodiment, the API service invocation model is the asynchronous invocation model.

In one embodiment, the sequence of zone-based topics is denoted as $T_1, T_2, \ldots, T_M$, wherein M is at least 3. Posting the message to the zone-based topic $T_m$ is performed by executing the worker selected for the zone-based topic $T_{m-1}$ (m=2, . . . , and M).

In one embodiment, a worker HEAD receives the API service request sent by the client entity, and wherein the posting of the message to the zone-based topic $T_1$ is performed by executing the worker HEAD.

In one embodiment, each topic is zone-based with respect to N zones, wherein N is at least 2.

In one embodiment, N is constant over the zone-based topics.

In one embodiment, N is not constant over the zone-based topics and differs for at least two of the zone-based topics.

In one embodiment, in response to a zone related problem pertaining to executing one worker selected for one zone-based topic wherein the one worker is executed in one zone of the N zones, the one worker is replaced by another worker subscribed to the one zone-based topic and is executed in another zone of the N zones. In one embodiment, the one worker selects the other worker for the replacement of the one worker and implements being replaced by the other worker.

In one embodiment, fulfillment of the API service is asynchronous to the client entity.

In one embodiment, the one or more processors are general purpose processors.

In one embodiment, the one or more processors comprise an application specific integrated circuit (ASIC), and wherein electrical circuitry within the ASIC is hard wired to perform the method.

Computer System

Figure 19:
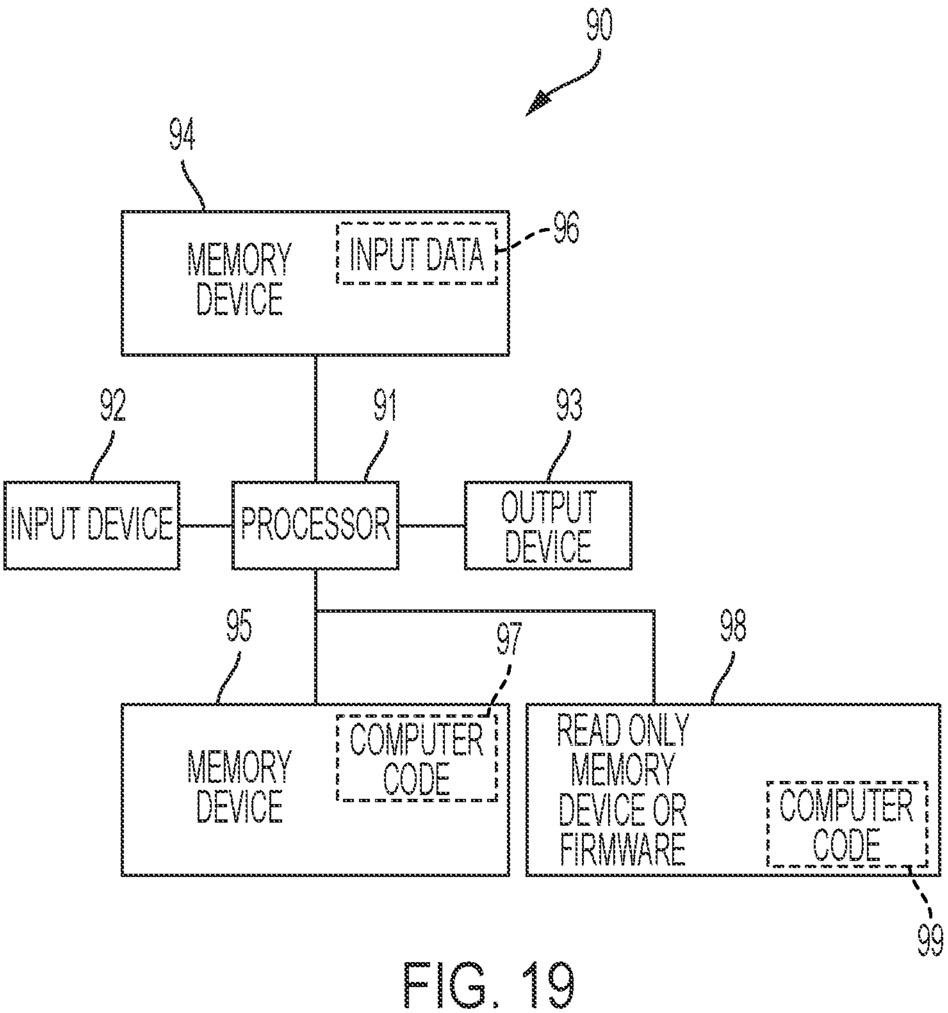
FIG. 19 illustrates a computer system, in accordance with embodiments of the present invention.

FIG. 19 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 98 (e.g., including algorithms) may be stored on a static, nonremovable, read-only storage medium such as a Read-Only Memory (ROM) device 99, or may be accessed by processor 91 directly from such a static, nonremovable, read-only medium 99. Similarly, in some embodiments, stored computer program code 97 may be stored as computer-readable firmware 99, or may be accessed by processor 91 directly from such firmware 99, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 19 shows the computer system 90 as a particular configuration of hardware and software, any configuration of hardware and software, as would be known to a person of ordinary skill in the art, may be utilized for the purposes stated supra in conjunction with the particular computer system 90 of FIG. 1. For example, the memory devices 94 and 95 may be portions of a single memory device rather than separate memory devices.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In one embodiment, a computer program product of the present invention comprises one or more computer readable hardware storage devices having computer readable program code stored therein, said program code containing instructions executable by one or more processors of a computer system to implement the methods of the present invention. In one embodiment, the one or more processors are general-purpose processors such as, inter alia, a Central Processing Unit (CPU).

In one embodiment, a computer system of the present invention comprises one or more processors, one or more memories, and one or more computer readable hardware storage devices. In one embodiment, the one or more processors are general-purpose processors such as, inter alia, a Central Processing Unit (CPU), wherein the one or more hardware storage devices contain program code executable by the one or more processors via the one or more memories to implement the methods of the present invention. In one embodiment, the one or more processors are special-purpose processors such as, inter alia, an Application-Specific Integrated Circuit (ASIC).

A "processor" herein may be either a general-purpose processor such as, inter alia, a Central Processing Unit (CPU) or a special-purpose processor such as, inter alia, an Application-Specific Integrated Circuit (ASIC). The general-purpose processor (e.g., CPU) and the special-purpose processor (e.g., ASIC) are each a hardware component, namely a chip, within the computer system of the present invention.

The general-purpose processor (e.g., CPU) used for the present invention is a chip configured to execute program code that is software stored in one or computer readable hardware storage devices located external to the general-purpose processor. The program code, upon being executed by the general-purpose processor, performs embodiments of the present invention but is also configured to execute a large variety of other software unrelated to the present invention.

The special-purpose processor (e.g., ASIC) used for the present invention is a chip customized for a particular use, namely for executing embodiments of the present invention. All of the algorithms of the present invention are incorporated within the circuitry and logic of the special-purpose processor. Thus, the electrical circuitry within the special-purpose processor is hard wired to perform the embodiments of the present invention. The special-purpose processor is not capable of general-purpose usage and thus can be used only for executing embodiments of the present invention.

The special-purpose processor (e.g., ASIC) provides the following improvements for the functioning of the computer of the computer of the computer system as compared with the general-purpose processor (e.g., CPU).

As a first improvement provided by the special-purpose processor, the special-purpose processor consumes less power than the general-purpose processor.

As a second improvement provided by the special-purpose processor, the special-purpose processor executes algorithms of the present invention faster (i.e., at a higher execution speed) than does the general-purpose processor for the following reasons. First, the special-purpose processor is specific to the embodiments of the present invention and is designed in hardware to optimize speed of execution of embodiments of the present invention. Second, the execution logic of the embodiments of the present invention is incorporated within the logic and circuitry of the special-purpose processor. In contrast, each executable instruction of the program code, which is stored in computer readable storage external to the general-purpose processor, is accessed from the external storage by the general-purpose processor before being executed by the general-purpose processor, which is a time cost not experienced by the special-purpose processor.

As a third improvement provided by the special-purpose processor, the special-purpose processor is smaller in size than the general-purpose processor and thus occupies less space than the general-purpose processor.

As a fourth improvement provided by the special-purpose processor, the special-purpose processor avoids having to store program code that would be executed by the general-purpose processor and thus saves data storage space.

As a fifth improvement provided by the special-purpose processor, the special-purpose processor involves usage of fewer hardware parts than does the general-purpose processor and is therefore less prone to hardware failure and is accordingly more reliable.

Examples and embodiments of the present invention described herein have been presented for illustrative purposes and should not be construed to be exhaustive. While embodiments of the present invention have been described herein for purposes of illustration, many modifications and changes will become apparent to those skilled in the art. The description of the present invention herein explains the principles underlying these examples and embodiments, in order to illustrate practical applications and technical improvements of the present invention over known technologies, computer systems, and/or products.

What is claimed is:

1. A computer-implemented method for performing an Application Programming Interface (API) service using zone-based topics within a publish/subscribe (pub/sub) messaging infrastructure, said computer-implemented method comprising:

receiving, by one or more processors, an API service request sent by a client entity, said API service request specifying the API service to be fulfilled;

receiving, by the one or more processors, a selection of an API service endpoint, wherein the API service endpoint is configured to execute the API service;

receiving, by the one or more processors, a selection of an API service invocation model supported by the selected API service endpoint, wherein the API service invocation model is one of a synchronous invocation model or an asynchronous invocation model, with respect to interactions between the API service endpoint and workers;

posting, by the one or more processors, messages to respective pub/sub zone-based topics of a sequence of zone-based topics, based on the selected API service invocation model;

selecting, by the one or more processors, the workers who are subscribed to the respective pub/sub zone-based topics, each zone-based topic of the sequence of zone-based topics comprising one or more tasks to be performed in a specified one or more zones; and implementing, by the one or more processors, for each zone-based topic of the sequence of zone-based topics, the one or more tasks, wherein said implementing of the one or more tasks is having been performed by executing a corresponding worker of the selected workers, selected for the zone-based topic, said implementing of the one or more tasks is in accordance with the selected API service invocation model, the one or more tasks of the zone-based topics include invoking the API service endpoint for the API service and making a fulfillment result of the API service available to the client entity, and the invoking of the API service endpoint is in accordance with the selected API service invocation model.

2. The computer-implemented method of claim 1, wherein for each zone-based topic of the sequence of zone-based topics, the one or more tasks include a task to update a fulfillment status indicator denoting an extent to which the API service request has been fulfilled.

3. The computer-implemented method of claim 1, wherein the API service invocation model is the synchronous invocation model.

4. The computer-implemented method of claim 1, wherein the API service invocation model is the asynchronous invocation model.

5. The computer-implemented method of claim 1, wherein the sequence of zone-based topics is denoted as T1, T2, . . . , $T_M$, M is at least 3, said posting of a message to a first zone-based topic $T_m$ is performed by executing a worker selected for a second zone-based topic $T_{m-1}$ (m=2, . . . , and M), the messages include the message, the workers include the worker, and the sequence of zone-based topics includes the first zone-based topic and the second zone-based topic.

6. The computer-implemented method of claim 5, wherein a worker HEAD, of the workers, receives the API service request sent by the client entity, and wherein said posting of the message to a zone-based topic $T_1$ of the sequence of zone-based topics is performed by executing the worker HEAD.

7. The computer-implemented method of claim 1, wherein each topic of the sequence of zone-based topics is zone-based with respect to N zones, and wherein N is at least 2.

8. The computer-implemented method of claim 7, wherein N is constant over the sequence of zone-based topics.

9. The computer-implemented method of claim 7, wherein N is not constant over the sequence of zone-based topics and differs for at least two of the sequence of zone-based topics.

10. The computer-implemented method of claim 7, further comprising:

in response to a zone related problem pertaining to executing of a first worker selected for a zone-based topic of the sequence of zone-based topics wherein the first worker is executed in a first zone of the N zones, replacing, by the one or more processors, the first worker by a second worker subscribed to the zone-based topic and is executed in a second zone of the N zones.

11. The computer-implemented method of claim 1, wherein the fulfillment result of the API service is asynchronous to the client entity.

12. The computer-implemented method of claim 1, wherein the one or more processors are general purpose processors.

13. The computer-implemented method of claim 1, wherein the one or more processors comprise an application specific integrated circuit (ASIC), and wherein electrical circuitry within the ASIC is hard wired to perform the computer-implemented method.

14. A computer program product, comprising:

one or more computer readable hardware storage devices having computer readable program code stored therein, said program code containing instructions executable by one or more processors of a computer system to implement a method for performing an Application Programming Interface (API) service using zone-based topics within a publish/subscribe (pub/sub) messaging infrastructure, said method comprising:

receiving, by the one or more processors, an API service request sent by a client entity, said API service request specifying the API service to be fulfilled;

receiving, by the one or more processors, a selection of an API service endpoint, wherein the API service endpoint is configured to execute the API service;

receiving, by the one or more processors, a selection of an API service invocation model supported by the selected API service endpoint, wherein the API service invocation model is one of a synchronous invocation model or an asynchronous invocation model, with respect to interactions between the API service endpoint and workers;

posting, by the one or more processors, messages to respective pub/sub zone-based topics of a sequence of zone-based topics, based on the selected API service invocation model;

selecting, by the one or more processors, the workers who are subscribed to the respective pub/sub zone-based topics, each zone-based topic of the sequence of zone-based topics comprising one or more tasks to be performed in a specified one or more zones; and implementing, by the one or more processors, for each zone-based topic of the sequence of zone-based topics, the one or more tasks, wherein said implementing of the one or more tasks is performed by executing a corresponding worker of the selected workers, selected for the zone-based topic, said implementing of the one or more tasks is in accordance with the selected API service invocation model, one or more tasks of the zone-based topics include invoking the API service endpoint for the API service and making a fulfillment result of the API service available to the client entity, and the invoking of the API service endpoint is in accordance with the selected API service invocation model.

15. The computer program product of claim 14, wherein for each zone-based topic of the sequence of zone-based topics, the one or more tasks include a task to update a fulfillment status indicator denoting an extent to which the API service request has been fulfilled.

16. A computer system, comprising:

one or more processors;

one or more memories; and one or more computer readable hardware storage devices, said one or more computer readable hardware storage devices containing program code executable by the one or more processors via the one or more memories to implement a method for performing an Application Programming Interface (API) service using zone-based topics within a publish/subscribe (pub/sub) messaging infrastructure, said method comprising:

receiving, by the one or more processors, an API service request sent by a client entity, said API service request specifying the API service to be fulfilled;

receiving, by the one or more processors, a selection of an API service endpoint, wherein the API service endpoint is configured to execute the API service;

receiving, by the one or more processors, a selection of an API service invocation model supported by the selected API service endpoint, wherein the API service invocation model is one of a synchronous invocation model or an asynchronous invocation model, with respect to interactions between the API service endpoint and workers;

posting, by the one or more processors, messages to respective pub/sub zone-based topics of a sequence of zone-based topics, based on the selected API service invocation model;

selecting, by the one or more processors, the workers who are subscribed to the respective pub/sub zone-based topics, each zone-based topic of the sequence of zone-based topics comprising one or more tasks to be performed in a specified one or more zones; and implementing, by the one or more processors, for each zone-based topic of the sequence of zone-based topics, the one or more tasks, wherein said implementing of the one or more tasks is performed by executing a corresponding worker of the selected workers, selected for the zone-based topic, said implementing of the one or more tasks is in accordance with the selected API service invocation model, the one or more tasks of the zone-based topics include invoking the API service endpoint for the API service and making a fulfillment result of the API service available to the client entity, and the invoking of the API service endpoint is in accordance with the selected API service invocation model.

17. The computer system of claim 16, wherein for each zone-based topic of the sequence of zone-based topics, the one or more tasks include a task to update a fulfillment status indicator denoting an extent to which the API service request has been fulfilled.

* * * * *